US012781615B2

(12) United States Patent
Wang et al.

(10) Patent No.: US 12,781,615 B2
(45) Date of Patent: Nov. 3, 2026

(54) MICROANNULUS AND CEMENT BOND EVALUATION USING MULTI-MODE MEASUREMENTS

(71) Applicant: Halliburton Energy Services, Inc., Houston, TX (US)

(72) Inventors: Ruijia Wang, Singapore (SG); Jing Jin, Singapore (SG); Jichun Sun, Singapore (SG); Amit Padhi, Houston, TX (US); Ramiro Andres Gonzalez Carrillo, Houston, TX (US); Xiang Wu, Singapore (SG); Yingyu Qi, Singapore (SG)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 168 days.

(21) Appl. No.: 18/436,957

(22) Filed: Feb. 8, 2024

(65) Prior Publication Data

US 2025/0257647 A1 Aug. 14, 2025

(51) Int. Cl.
*E21B 47/005* (2012.01)
*G01N 29/11* (2006.01)
(Continued)

(52) U.S. Cl.
CPC ............ *E21B 47/005* (2020.05); *G01N 29/11* (2013.01); *G01N 29/34* (2013.01); *G01N 29/36* (2013.01);
(Continued)

(58) Field of Classification Search
CPC ..... E21B 47/005; E21B 47/085; G01N 29/11; G01N 29/34; G01N 29/36;
(Continued)

(56) References Cited

U.S. PATENT DOCUMENTS 4,255,798 A 3/1981 Havira
5,763,773 A * 6/1998 Birchak ................ E21B 47/005 73/152.58
(Continued)

FOREIGN PATENT DOCUMENTS

CN 109882152 B * 9/2022
EP 0263028 B1 1/1992
(Continued)

OTHER PUBLICATIONS

Abstract of Jutten, J.J. et al., "Microannulus Effect on Cementation Logs: Experiments and Case Histories", Paper presented at the SPE Asia Pacific Oil and Gas Conference, Singapore, Feb. 1993; Paper No. SPE-25377-MS.
(Continued)

*Primary Examiner* — Daniel Pihulic
(74) *Attorney, Agent, or Firm* — NOVAK DRUCE CARROLL LLP

(57) ABSTRACT

Aspects of the subject technology relate to systems, methods, and computer-readable media for determining a quality of cementation and detecting a presence of microannulus formations within the cement bonded to the casing. An example method may include transmitting a first type of energy at a first angle to a surface of a casing of a wellbore. In some instances, the casing may be bonded to cement layer that is between the casing and a formation of the wellbore. Additionally, the example method may include receiving a first signal from the casing. Moreover, the example method may include determining a first attenuation of the first type of energy based on the first signal. Further, the example method may include determining whether microannulus formation is present between the casing and the cement layer based on one or more characteristics of the first attenuation.

20 Claims, 15 Drawing Sheets

(51) Int. Cl.
*G01N 29/34* (2006.01)
*G01N 29/36* (2006.01)

(52) U.S. Cl.
CPC .................. *G01N 2291/015* (2013.01); *G01N 2291/0245* (2013.01); *G01N 2291/0289* (2013.01); *G01N 2291/0427* (2013.01)

(58) Field of Classification Search
CPC ..... G01N 2291/015; G01N 2291/0245; G01N 2291/0289; G01N 2291/0427
See application file for complete search history.

(56) References Cited

U.S. PATENT DOCUMENTS

| | | | | |
|---|---|---|---|---|
| 6,483,777 | B1 | 11/2002 | Zeroug | |
| 2005/0205268 | A1 | 9/2005 | Engels et al. | |
| 2007/0206439 | A1* | 9/2007 | Barolak | E21B 47/005 367/35 |
| 2009/0173500 | A1 | 7/2009 | Orban et al. | |
| 2017/0139072 | A1* | 5/2017 | Kalyanraman | G01N 33/383 |
| 2018/0298720 | A1 | 10/2018 | Billingham et al. | |
| 2021/0285324 | A1* | 9/2021 | Sirevaag | E21B 47/14 |
| 2025/0257647 | A1* | 8/2025 | Wang | E21B 47/085 |

FOREIGN PATENT DOCUMENTS

| | | | | |
|---|---|---|---|---|
| EP | 0837217 | A2 * | 4/1998 | E21B 47/005 |
| EP | 1275983 | A2 * | 1/2003 | G01V 1/44 |
| WO | 2014042874 | A1 | 3/2014 | |
| WO | WO-2022011294 | A1 * | 1/2022 | E21B 47/005 |
| WO | WO-2025170594 | A1 * | 8/2025 | G01N 29/11 |

OTHER PUBLICATIONS

Abstract of Kalyanraman, Ram Sunder et al., “Making Sense of Why Sometimes Logs Do Not See Cement in the Annulus”, Paper presented at the SPE Western Regional Meeting, Bakersfield, California, Apr. 2017; Paper No. SPE-185731-MS.

Abstract of Kalyanraman, Ram Sunder et al., “Autonomous Interpretation Methods of Ultrasonic Data Through Machine Learning Facilitates Novel and Reliable Casing Annulus Characterization”; Paper presented at the SPE/IADC International Drilling Conference and Exhibition, Virtual, Mar. 2021; Paper No. SPE-204078-MS.

International Search Report & Written Opinion; PCT Application No. PCT/US2024/015227; mailed Oct. 29, 2024.

* cited by examiner

400

1400

MICROANNULUS AND CEMENT BOND EVALUATION USING MULTI-MODE MEASUREMENTS

BACKGROUND

1. Technical Field

The present disclosure generally relates to microannulus detection and cement bond evaluation.

2. Introduction

In some examples, a drill site may include one or more wells. Additionally, a wellbore of each of the one or more wells may be cased. For example, casing or tubing may line the surface of the wellbore. Additionally, an adhesive material, such as cement, may be utilized to affix the casing or tubing to the surface of the wellbore. In such examples, a microannulus may form between the casing and the adhesive material, such as cement, that affixes the casing to the wellbore surface.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
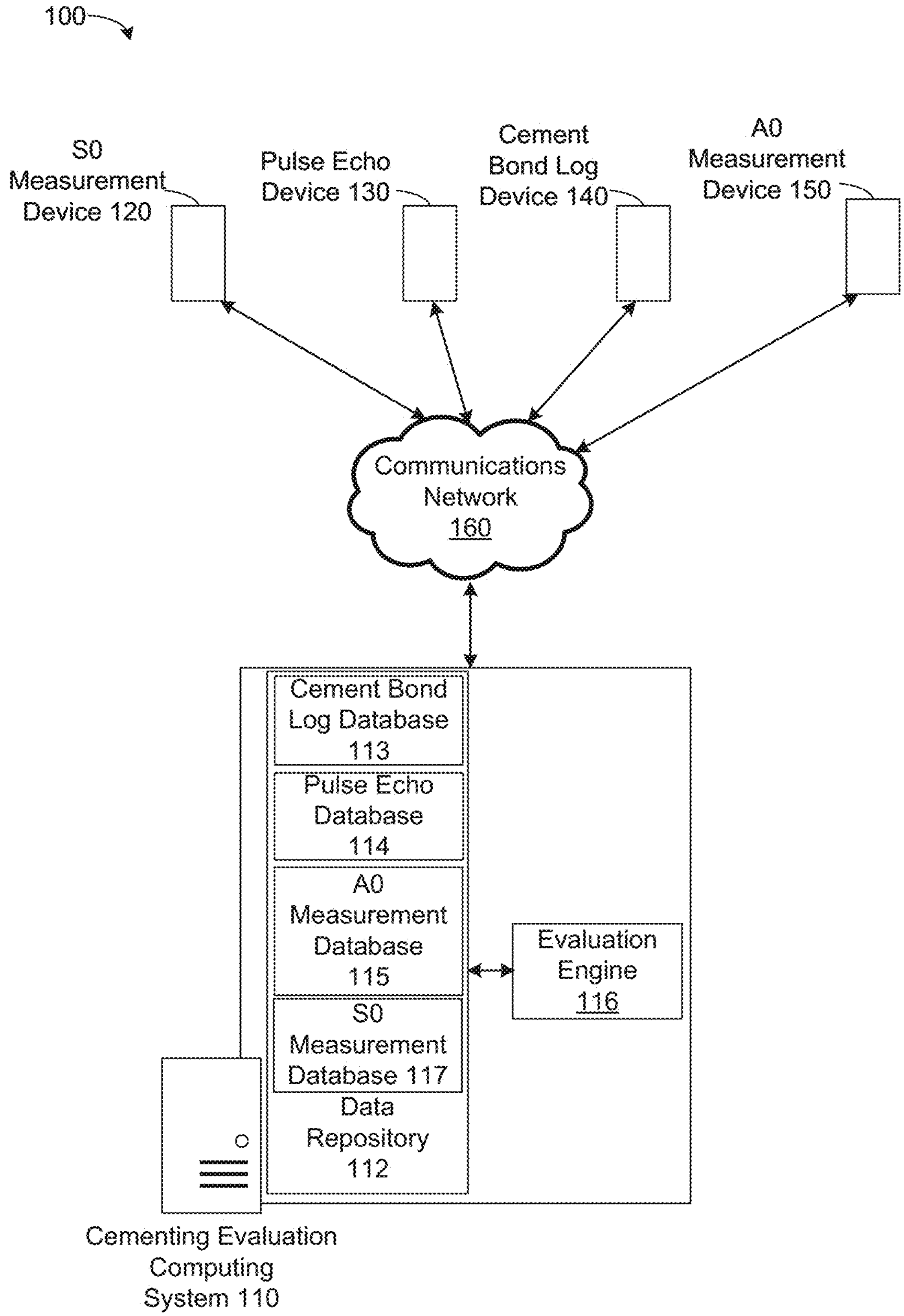
FIG. 1 illustrates an example computing environment, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology.

However, it will be clear and apparent that the subject technology is not limited to the specific details set forth herein and may be practiced without these details. In some instances, structures and components are shown in block diagram form to avoid obscuring the concepts of the subject technology.

Cementing a space between a casing and the surface of the wellbore is a key operation during drilling and completion to provide an effective hydraulic isolation. Additionally, cementing may restrict fluid flow between formations around the well bore by providing an effective cement bond between a casing, such as a steel casing, and the formations. However, the quality of cementation could be affected by microannulus formations (e.g., a fine gap) that may develop between cement and the casing, called microannulus. In some examples, cementing evaluation processes may be implemented to determine the quality of the cementation. Examples of cement evaluation processes may include the Pulse Echo technique, the Cement Bond Log (CBL) technique and the flexural Mode technique. In such examples, measurements of the techniques for cement evaluation may be interpreted independently or jointly to determine the quality of the cementing of a wellbore. For example, the joint interpretation of measurements of the Pulse Echo technique and measurements of the CBL technique may indicate the cementing quality of a wellbore. As described herein, the measurements of the CBL technique may be sensitive to the loss of shear coupling between casing and cement, while the measurements of the Pulse-Echo technique may provide apparent annulus impedance which may have been tampered by the presence of microannulus. A combined use of the measurements of the CBL technique and the measurements of the Pulse-Echo technique may provide information about the cementing work quality. However, the CBL technique may have some limitations. For instance, the CBL technique includes utilizing a sonic tool to transmit/output a frequency around 20 kHz to a casing of a wellbore. As such, measurements by the sonic tool may not have a high spatial resolution, axially or azimuthally (e.g., may only indicate the quality of the bond between the cement and the casing and not whether the quality of the bond is due to a microannulus formation).

In another example, Pulse Echo and Flexural mode attenuation measurements may be used jointly to determine the quality of the cementation. In such an example, the Pulse Echo and flexural mode attenuation measurements are each affected differently by the presence of microannulus formations. However, despite various creative schemes, cement bond evaluation in the presence of possible microannulus is still challenging. For instance, the Pulse Echo technique may be performed twice, with and without additional borehole pressure to close the gap, to obtain enough measurements to determine the quality of the cementation. Such techniques are costly. Further, the impedance from Pulse Echo measurement is not mapped from the readings directly, but derived from inversion schemes, making use of the amplitude ratio, reverberation decay, and/or group delay in frequency domain, and often followed by calibration. Similar to all inversion schemes, there is uncertainty in the output value. The uncertainty of Pulse Echo impedance is in the range of +/−0.5Mrayl. Such uncertainty can affect interpretation in some situations. In another instance, the flexural mode attenuation measurements utilize flexural wave or asymmetric lamb waves (e.g., A0). As described herein, the asymmetric lamb waves may indicate the type of material behind the casing of the medium, such as gas, liquid or solid, but may not be sensitive to the presence of microannulus formations.

Aspects of the disclosed technology provide solutions for reducing the uncertainties and drawbacks associated with the above describe techniques for determining a quality of cementation and detecting a presence of microannulus formations within the cement bonded to the casing. Additionally, the solutions may include generating a first type of ultrasonic waves, such as symmetric lamb waves, that are more sensitive to the presence of microannulus formations within the cement, and utilizing measurements associated with the first type of ultrasonic waves to determine the quality of the cementation, detecting a presence of microannulus formations within the cement, and in some instances, calculating an impedance of the cement and estimating the microannulus thickness.

In some examples, a method comprises transmitting a first type of energy at a first angle to a surface of a casing of a wellbore. In some instances, the casing may be bonded to cement layer that is between the casing and a formation of the wellbore. Additionally, the method may further comprise receiving a first signal from the casing. Moreover, the method may further comprise determining a first attenuation of the first type of energy based on the first signal. Further, the method may further comprise determining whether microannulus formation is present between the casing and the cement layer based on one or more characteristics of the first attenuation.

In other examples, a computing system may comprise a communications interface, a memory storing instructions, and at least one processor coupled to the communications interface and the memory. In such examples, the at least one processor may be configured to execute the instructions to transmit a first type of energy at a first angle and to a surface of a casing of a wellbore. In some instances, the casing being bonded to cement layer that is between the casing and a formation of the wellbore. Additionally, the at least one processor may be further configured to receive a first signal from the casing. Moreover, the at least one processor may be further configured to determine a first attenuation of the first type of energy based on the first signal. Further, the at least one processor may be further configured to determine whether a microannulus formation is present between the casing and the cement layer based on one or more characteristics of the first attenuation.

In various examples, a non-transitory computer-readable storage medium storing instructions that, when executed by at least one processor, cause the at least one processor to perform operations comprising transmitting a first type of energy at a first angle to a surface of a casing of a wellbore. In some instances, the casing being bonded to cement layer that is between the casing and a formation of the wellbore. Additionally, the operations further comprise receiving a first signal from the casing. Moreover, the operations further comprise determining a first attenuation of the first type of energy based on the first signal. Further, the operations further comprise determining a microannulus formation is present between the casing and the cement layer based on one or more characteristics of the first attenuation.

Referring to FIG. 1, example computing environment 100 may include a computing system, such as cementing evaluation computing system 110 (herein described as "CE" computing system 110) and one or more computing devices, such as S0 measurement device 120, pulse echo device 130, cement bond long device 140 and A0 measurement device 150. Additionally, CE computing system 110 may represent a computing system that includes one or more servers and tangible, non-transitory memory devices storing executable code and application modules. The one or more servers may each include one or more processors or processor-based computing devices, which may be configured to execute portions of the stored code or application modules to perform operations consistent with the disclosed embodiments. Moreover, CE computing system 110 may include a communications unit or interface coupled to the one or more processors for accommodating wired or wireless communication across one or more communications networks. Further, each of the computing system and the one or more computing devices may be interconnected through any appropriate combination of communications networks, such as communications network 160.

Examples of communications network 160 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet. In some instances, the devices and systems operating within computing environment 100 may perform operations that establish and maintain one or more secure channels of communication across communications network 160, such as, but not limited to, a transport layer security (TSL) channel, a secure socket layer (SSL) channel, or any other suitable secure communication channel.

As described herein, the computing system, such as the CE computing system 110 may obtain information about a state of cement that seals an annulus between a casing and a surface of a wellbore the casing is in, such as sound waves/signals propagating through and/or reflected off a medium. In some instances, the medium may include a casing and cement bonded to the casing. Although the description discusses cement, the disclosure provided herein may apply to any material being utilized to seal an annulus between the casing and the surface of the wellbore the casing is in. Additionally, the computing system may determine one or more measurements and characteristics associated with the state of the cement, such as the amplitude of a sound wave. Moreover, the computing system may utilize the one or more measurements to determine whether a microannulus formation is present in the cement.

Figure 2:
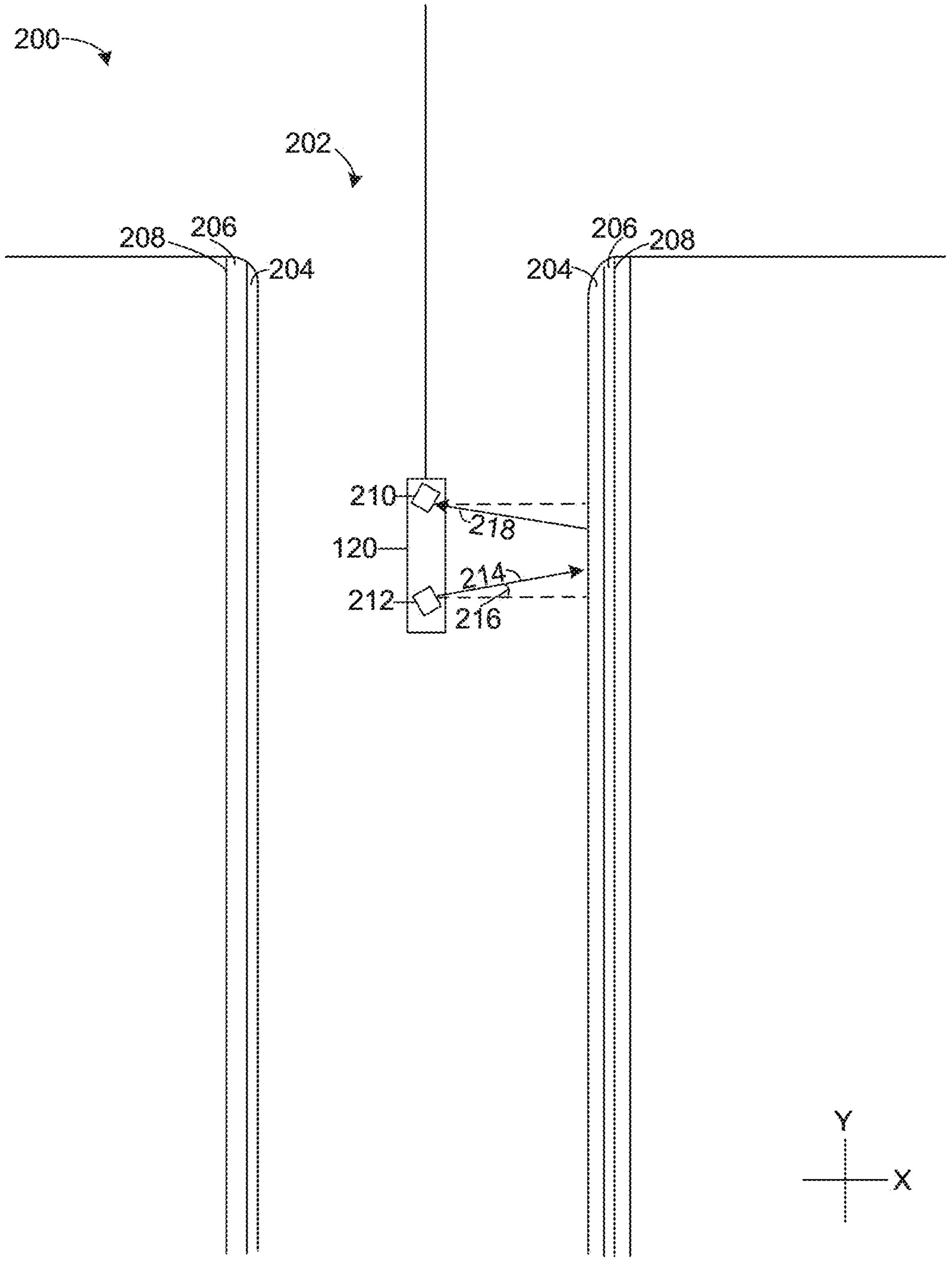
FIG. 2 illustrates an example S0 measurement device within an example wellbore according to some examples of the present disclosure.

In some examples, CE computing system 110 may obtain the information about the state of the cement from S0 measurement device 120. In such examples, S0 measurement device 120 may include one or more transducers, and one or more receivers. In some instances, the one or more transducers may be configured to project, output or transmit sound 214 at ultrasonic frequencies, such as between 200 kHz to 300 kHz, towards a casing and cement that is bonded to the casing. Additionally, the one or more transducers may transmit the sound at angle 216, such as between 0 degrees with respect to a horizontal plane or axis and 35 degrees above the horizontal plane or axis. In some instances, the one or more transducers may each be attached to an electrical and/or mechanical component that may adjust angle 216 that the transducers transmit or project sound 214. Further, the one or more receivers may be configured to detect sound signal 218 of the projected sound that may be propagating and attenuating through the casing and the cement. By way of example, FIG. 2 illustrates environment 200 that includes S0 measurement device 120 within casing 204 of wellbore 202. In some instances, wellbore 202 may be filled with fluid that may carry energy to and from casing 204. Additionally, environment 200 may include cement layer 206 that is between the surface 208 of wellbore 202 and casing 204. Moreover, S0 measurement device 120 may include transducer 212 and receiver 210. As described herein, transducer 212 may transmit or project sound 214 at an ultrasonic frequency towards casing 204, and in some instances, through the fluid in wellbore 202. Additionally, transducer 212 may project the sound at angle 216 above a horizontal plane or axis (e.g., x-axis). The projected sound 214 may propagate through casing 204 and cement layer 206 and may attenuate as it propagates through casing 204 and cement layer 206. Moreover, receiver 210 may detect a sound signal 218 of projected sound 214 propagating through casing 204, cement layer 206, and in some instances, through the fluid. A processor and communications interface (not illustrated in FIG. 2) may transmit the detected sound signal 218 to CE computing system 110.

Figure 3:
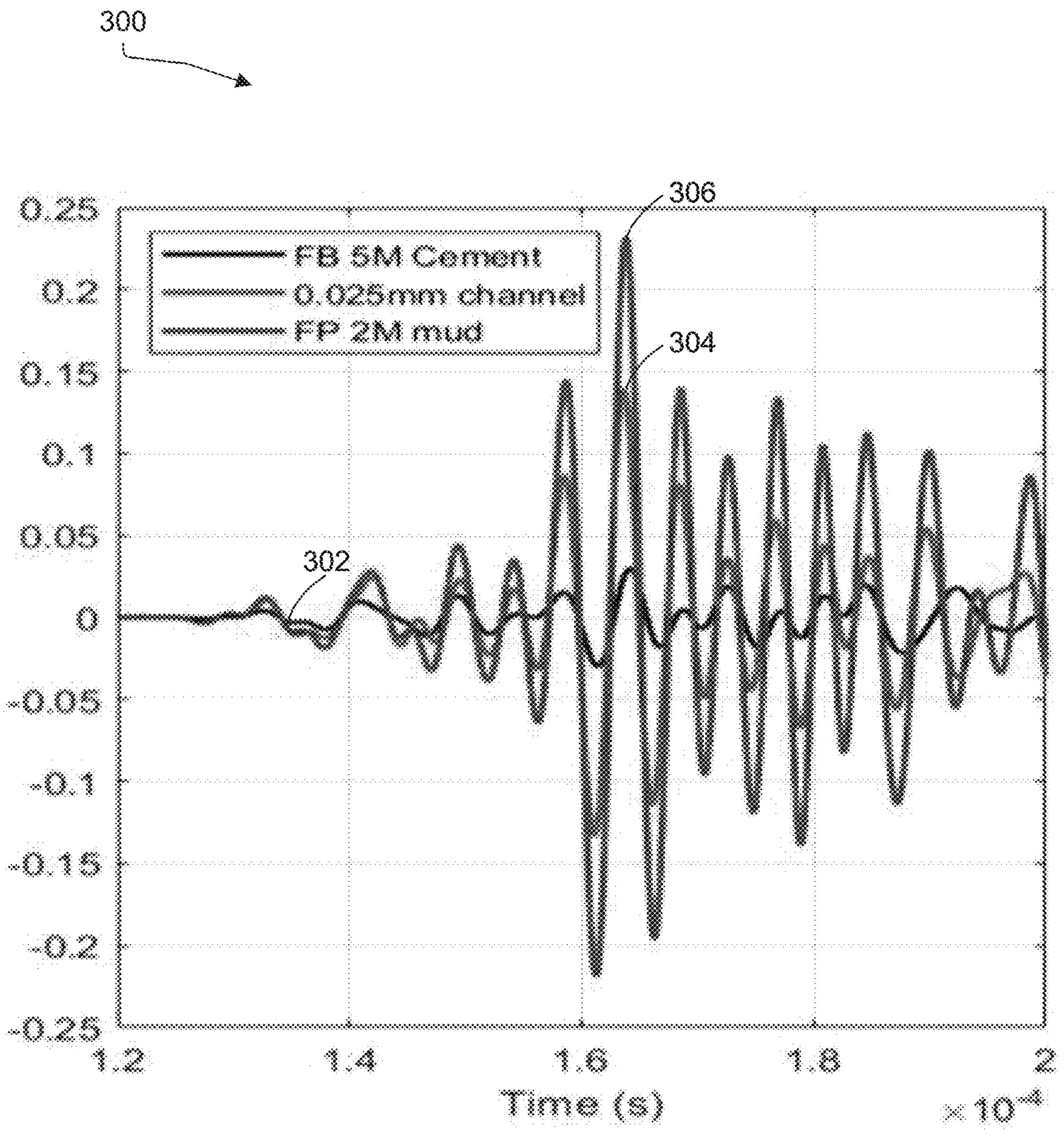
FIG. 3 illustrates an example graph illustrating symmetric lamb wave energy after it passes through mediums with various types of annulus materials, according to some examples of the present disclosure.

As described herein, sound projected to the casing and the cement may be in ultrasonic frequencies and may be projected at an angle towards the casing and the cement bonded to the casing. Additionally, the sound signal of the projected sound that is propagating and attenuating through the casing and the cement may include symmetric (e.g., S0) lamb waves. The symmetric lamb waves may be sensitive to the presence of microannulus formations in the material. For example, and referring to FIG. 3, example graph 300 illustrates the attenuation of energy including symmetric lamb wave dominant ultrasonic sound waves, such as ultrasonic sound wave 302, ultrasonic sound wave 304 and ultrasonic sound wave 306, as it passes through mediums with various types of annulus materials. As illustrated in FIG. 3, the mediums may include a 0.5 inch steel casing fully bonded to a 5 Mrayl cement with no microannulus formations, a 0.5 inch steel casing bonded to a 5 Mrayl cement with a 0.025 mm microannulus formation or channel, and a 0.5 inch steel casing adjacent to a 2 Mrayl mud. Additionally, the detected sound signals may each have originated from an ultrasonic sound projected at the same frequency, such as 200 kHz, to the corresponding medium. Moreover, each of the detected sound signals may be projected to corresponding mediums at the same angle, such as a 10 degree angle above a horizontal plane or axis. As indicated by graph 300, the amplitude of ultrasonic sound wave 302 may be smaller than the amplitude of ultrasonic sound wave 306 because the ultrasonic sound may be better absorbed by a casing fully bonded to a cement layer with no gaps or microannulus formations than a casing that is bonded to a cement layer that includes microannulus formations. As such, an ultrasonic sound wave may indicate the presence of a microannulus formation when the amplitude is larger. For reference and comparison with ultrasonic sound wave 302 and ultrasonic sound wave 304, ultrasonic sound wave 306 may characterize an ultrasonic sound propagating and attenuating through the casing in mud (e.g., a mud layer between the casing and the surface of the wellbore). The attenuation of ultrasonic sound wave 306 may be even less than the attenuation of ultrasonic sound wave 304 because mud may absorb the corresponding ultrasonic sound less than the casing that is bonded to a cement layer that includes microannulus formations.

Figure 4:
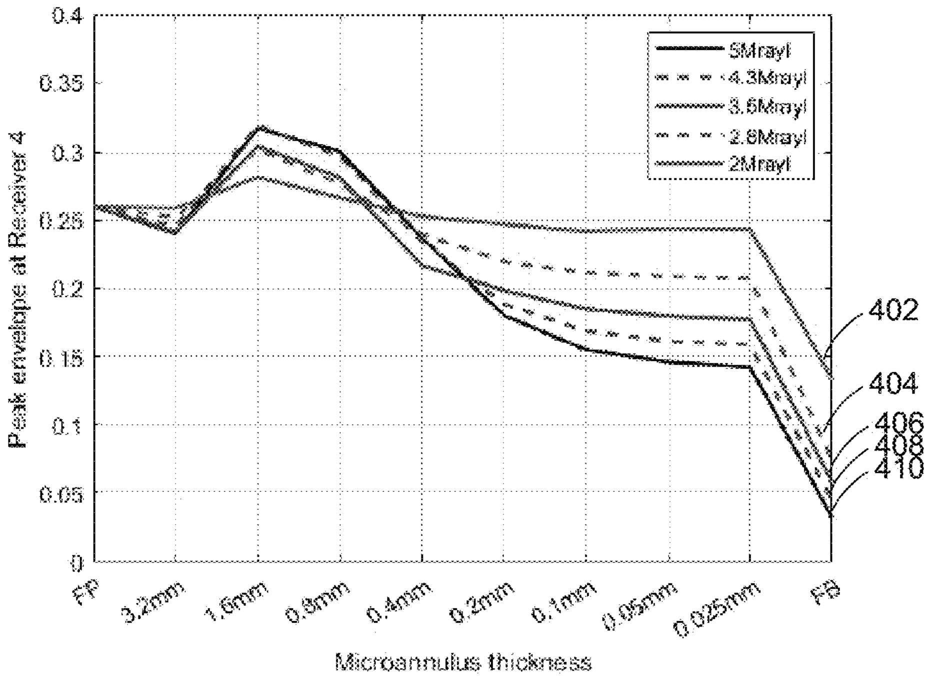
FIG. 4 illustrates an example graph illustrating peak amplitudes of symmetric lamb wave energy as it passes through mediums with various microannulus thicknesses, according to some examples of the present disclosure.

Additionally, the symmetric lamb waves may be sensitive to the thickness of the microannulus formations in the material. For example, and referring to FIG. 4, example graph 400 illustrates the peak amplitudes of symmetric lamb wave dominant ultrasonic sound waves or signals propagating and attenuating through mediums with various types of annulus materials. Additionally, a receiver of an S0 measurement device, such as receiver 210 of FIG. 2 may detect the sound waves or signals. The sound waves or signals may include symmetric lamb waves. As illustrated in FIG. 4, graph 400 may include peak amplitudes of a detected symmetric dominant ultrasonic sound wave 402, symmetric dominant ultrasonic sound wave 404, symmetric dominant ultrasonic sound wave 406, symmetric dominant ultrasonic sound wave 408 and symmetric dominant ultrasonic sound waves 410. Additionally, symmetric dominant ultrasonic sound wave 402, symmetric dominant ultrasonic sound wave 404, symmetric dominant ultrasonic sound wave 406, symmetric dominant ultrasonic sound wave 408 and symmetric dominant ultrasonic sound waves 410 may have propagated and attenuated through a 5 Mrayl cement, a 4.3 Mrayl cement, a 3.5 Mrayl cement, a 2.8 Mrayl cement, and a 2 Mrayl cement, respectively. Moreover, the detected sound signals may each have originated from an ultrasonic sound projected at the same frequency, such as 200 kHz, to the corresponding medium. Further, each of the detected sound signals may be projected to corresponding mediums at the same angle, such as a 10 degree angle above a horizontal plane or axis. As indicated by graph 400, the peak amplitude of each detected symmetric lamb wave dominant ultrasonic sound wave drops drastically the smaller the microannulus thickness. For instance, the peak amplitude of symmetric lamb wave dominant ultrasonic sound wave 406 propagating and attenuating through 2.8 Mrayl cement is much lower when the 2.8 Mrayl cement is fully bonded (FB) to cement compared to when the microannulus thickness is 1.6 millimeters (mm). The peak amplitudes of detected symmetric lamb wave dominant ultrasonic sound waves included in graph 400 are drastically lower when the corresponding material or cement is fully bonded to the casing as opposed to when there is any level of microannulus thickness or if it is a free pipe (FP).

Figure 5:
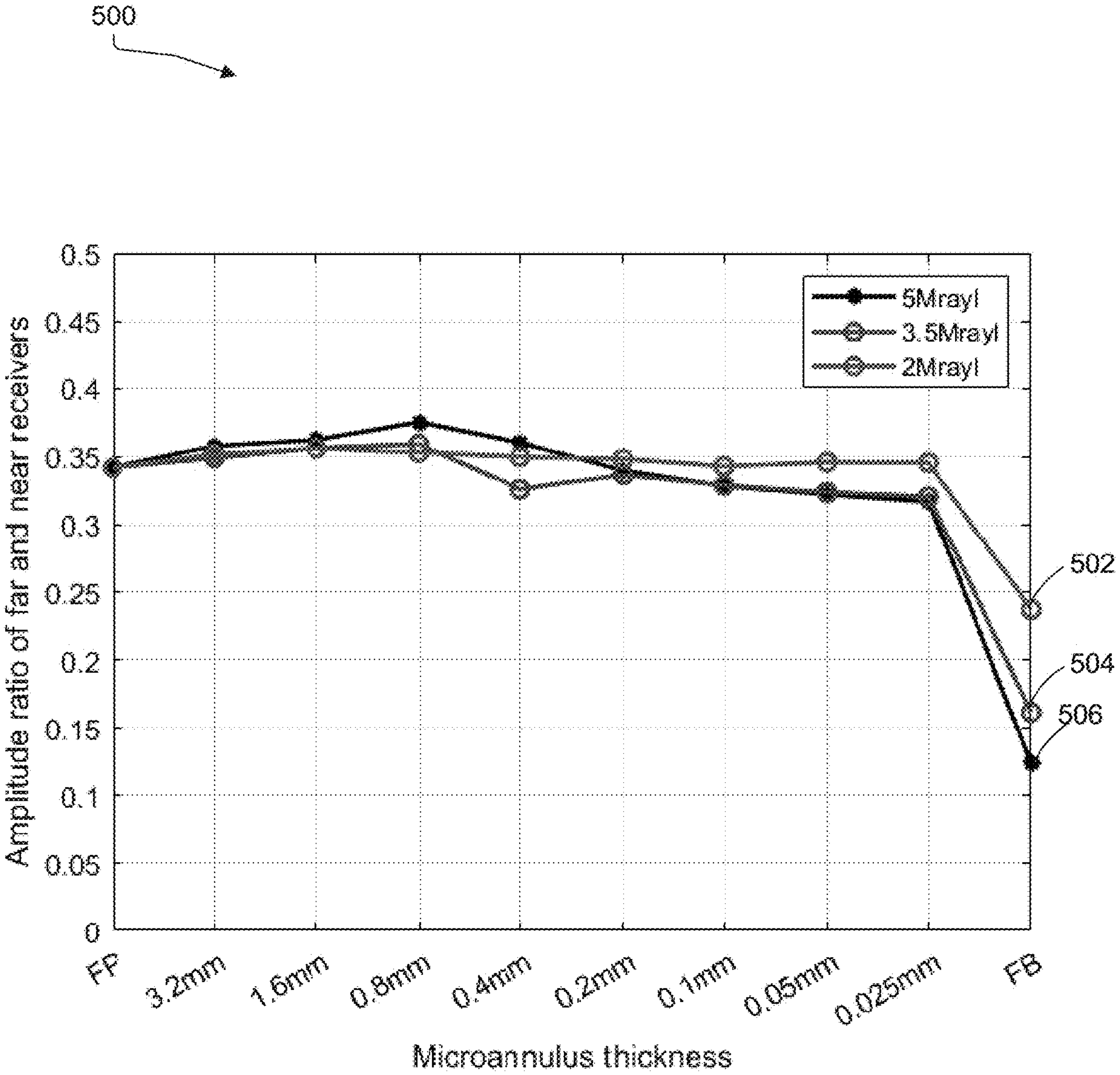
FIG. 5, illustrates an example graph illustrating peak amplitude ratios of energy detected by multiple receivers of a S0 measurement detection device as it passes through mediums with various microannulus thicknesses, according to some examples of the present disclosure.

FIG. 5 illustrates another example indicating the sensitivity of symmetric lamb waves with respect to the thickness of a microannulus formation. For example, example graph 500 illustrates peak amplitude ratios of symmetric lamb wave dominant ultrasonic sound waves or signals propagating and attenuating through mediums with various types of annulus materials. The peak amplitude ratios may be between two receivers of a S0 measurement device, such as S0 measurement device 120. For instance, a first receiver of S0 measurement device 120 may be 8 inches away from a transmitter of S0 measurement device 120, while a second receiver of S0 measurement device 120 may be 15 inches away from a transmitter of S0 measurement device 120. Additionally, graph 500 may include peak amplitude ratios of symmetric lamb wave dominant ultrasonic sound wave 502, symmetric lamb wave dominant ultrasonic sound wave 504, and symmetric lamb wave dominant ultrasonic sound wave 506. Moreover, symmetric lamb wave dominant ultrasonic sound wave 502, symmetric lamb wave dominant ultrasonic sound wave 504, and symmetric lamb wave dominant ultrasonic sound wave 506 may have propagated and attenuated through 5 Mrayl cement, a 3.5 Mrayl cement, and a 2 Mrayl cement, respectively. Further, the detected sound signals may each have originated from an ultrasonic sound projected at the same frequency, such as 200 kHz, to the corresponding medium. Additionally, each of the detected sound signals may be projected to corresponding mediums at the same angle, such as a 10 degree angle above a horizontal plane or axis. Similar to graph 400, graph 500 indicates the peak amplitude ratios of each detected ultrasonic sound wave drops drastically the smaller the microannulus thickness. For instance, the peak amplitude ratio of symmetric lamb wave dominant ultrasonic sound wave 502 propagating and attenuating through 5 Mrayl cement is much lower when the 5 Mrayl cement is fully bonded (FB) to a casing as compared to when the microannulus thickness is 0.025 mm. The peak amplitude ratios of the detected symmetric lamb wave dominant ultrasonic sound waves included in graph 500 are drastically lower when the corresponding material or cement is fully bonded to the casing as opposed to when there is any level of microannulus thickness or if it is a free pipe (FP).

Referring back to FIG. 1, S0 measurement device 120 may transmit, over one or more communications networks, such as communications network 160, the detected sound signals to CE computing system 110. In some examples, S0 measurement device 120 may include one or more processors and at least one communications interface or unit. In such examples, the one or more processors may transmit, over the one or more communications networks and to CE computing system 110, the sound signals via the communications interface or unit. Additionally, CE computing system 110 may receive the detected sound signal generated by S0 measurement device 120 and determine one or more measurements based on the detected sound signal. As described herein, the sound signal may include symmetric lamb waves. In some examples, S0 measurement device 120 may transmit, along with the detected sound signal, original sound data identifying and characterizing the frequency of the originally projected sound that corresponds to the detected sound signal and the angle at which the originally projected sound was projected at by one or more transducers of S0 measurement device 120.

In some examples, at least one processor of CE computing system 110 may execute evaluation engine 116. Executed evaluation engine 116 may obtain the detected sound signal from S0 measurement device 120 and determine the one or more measurements based on the detected sound signal. For instance, executed evaluation engine 116 may determine a waveform of the detected sound signal generated by S0 measurement device 120, such as ultrasonic sound wave 302 of FIG. 3. Additionally, executed evaluation engine 116 may determine one or more characteristics or measurements for the determined waveform, such as the amplitude. Further, executed evaluation engine 116 may generate measurement data that identifies and characterizes the one or more measurements of the determined waveform. In some instances, measurement data may include one or more portions of the original sound data. In such instances, measurement data may identify and characterize the frequency of the corresponding originally projected sound and/or the angle at which the originally projected sound was projected at. In other instances, executed evaluation engine 116 may perform operations that store, within the one or more tangible non-transitory memories of CE computing system 110, such as S0 measurement database 117 of data repository 112, the measurement data and the sound signal generated and received from S0 measurement device 120.

Additionally, CE computing system 110 may determine whether a microannulus formation is present in a medium based on measurement data. For example, executed evaluation engine 116 may determine whether a microannulus formation is present in a medium (e.g., a casing and cement bonded to the casing) the measurement data is associated with. In some instances, executed evaluation engine 116 may determine whether a microannulus formation is present in the medium associated with the measurement data based on the measurement data and reference data. As described herein, reference data may be stored in S0 measurement database 117 and may include a record of determined measurements of waveforms for different mediums. For instance, the record of reference data may identify one or more mediums. Additionally, the record may identify and characterize, for each of the one or more mediums, the dimensions of the casing and the material the casing is bonded to, such as cement, one or more measurements of a waveform determined for the medium, the waveform, a frequency of an originally projected sound the waveform corresponds to, and an angle the originally projected sound is projected from.

Further, executed evaluation engine 116 may determine the presence of the microannulus formation in the medium by comparing the measurement data with the reference data. By way of example, executed evaluation engine 116 may parse measurement data to determine the frequency of the corresponding originally projected sound and/or the angle at which the originally projected sound was projected at. Additionally, executed evaluation engine 116 may identify portions of reference data that identifies similar or matching frequency and/or angle. The identified portions may include one or more measurements or characteristics of wave forms of various casing and cementing compositions. For instance, and referring to FIG. 3, executed evaluation engine 116 may determine the frequency of the corresponding originally projected sound is 200 kHz and that the angle at which the originally projected sound is 10 degrees above a horizontal plane or axis. Additionally, based on the determined frequency and angle, executed evaluation engine 116 may identify one or more portions of reference data that identifies and characterizes waveforms and corresponding measurements as similarly illustrated and described with ultrasonic sound wave 302, ultrasonic sound wave 304 and ultrasonic sound wave 306. As illustrated in FIG. 3, ultrasonic sound wave 302 is associated with a casing and cementing composition where the casing and cement are fully bonded (e.g., 5 Myral cement fully bonded) with no microannulus formations, ultrasonic sound wave 304 is associated with a casing and cementing composition where the casing and cement are bonded (e.g., 5 Myral cement) with a 0.025 mm microannulus formation/channel, and ultrasonic sound wave 306 is associated with a casing and cementing composition where the casing is in mud (e.g., 2 Myral mud).

Moreover, executed evaluation engine 116 may compare the one or more measurements identified and characterized by the measurement data with one or more measurements identified and characterized by the identified portions of reference data. For instance, and referring back to FIG. 3, executed evaluation engine 116 may compare the one or more measurements of the measurement data, such as one or more amplitudes, to the amplitudes of at least ultrasonic sound wave 302 and ultrasonic sound wave 304. Based on the comparison, executed evaluation engine 116 may determine which of the one or more measurements or characteristics of wave forms of various casing and cementing compositions identified and characterized in the identified portions of reference data matches or is similar to the one or more measurements identified and characterized in the measurement data. Such a determination may indicate whether the measurement data indicates the presence of a microannulus formation in the medium. For instance, and referring back to FIG. 3, executed evaluation engine 116 may determine the one or more measurements identified and characterized in the measurement data, such as one or more amplitudes of a waveform included in measurement data, is similar to or matches one or more amplitudes of ultrasonic sound wave 302. In such an instance, executed evaluation engine 116 may determine the measurement data indicates no presence of a microannulus formation. In another instance, and referring back to FIG. 3, executed evaluation engine 116 may determine the one or more measurements identified and characterized in the measurement data, such as one or more amplitudes of a waveform included in measurement data, is similar to or matches one or more amplitudes of ultrasonic sound wave 304. In such an instance, executed evaluation engine 116 may determine the measurement data indicates a presence of a microannulus formation.

In some examples, CE computing system 110 may adjust the angle at which a transducer of S0 measurement device 120 projects or transmits sound. Additionally, or alternatively, CE computing system 110 may adjust the frequency of the sound projected or transmitted by the transducer of by S0 measurement device 120. In some instances, CE computing system 110 may transmit instructions to S0 measurement device 120 over one or more communications networks, such as communications network 160, and via a communications interface or unit of S0 measurement device 120. The instructions may indicate the angle that one or more transducers of S0 measurement device 120 is to project or transmit a sound towards the casing. Additionally, the communications interface may route the instructions to one or more processors of S0 measurement device 120. The one or more processors may cause an electrical or mechanical component of one or more transducers of S0 measurement device 120 to adjust the angle of the corresponding transducer in accordance with the angle indicated in the instructions. Additionally, or alternatively, the instructions may indicate the frequency of the projected sound. Further, the one or more processors may cause the one or more transducers to project the sound at the frequency indicated in the instructions. In some instances, the instructions may be based on a user provided input.

In other examples, CE computing system 110 may adjust the angle at which a receiver of S0 measurement device 120 may detect a sound signal propagating through the casing and the material. In such examples, CE computing system 110 may transmit instructions to S0 measurement device 120 over one or more communications networks, such as communications network 160, and via a communications interface or unit of S0 measurement device 120. The instructions may indicate the angle that one or more receivers of S0 measurement device 120 is to detect the sound signal propagating through the medium. Additionally, the communications interface may route the instructions to one or more processors of S0 measurement device 120. The one or more processors may cause an electrical or mechanical component of one or more receivers of S0 measurement device 120 to adjust the angle of the corresponding receiver in accordance with the angle indicated in the instructions. In some instances, the instructions may be based on a user provided input.

In various examples, CE computing system 110, such as executed evaluation engine 116, may perform any of the example processes described herein to determine the quality of the cementation, detecting a presence of microannulus formations within the medium (e.g., cement), and in some instances, calculating an impedance of the medium and estimating the microannulus thickness. In such examples, CE computing system 110 may utilize measurements associated with sound signals obtained from S0 measurement device 120, such as measurements associated with symmetric lamb wave dominant ultrasonic sound waves or signals, along with other measurements to make such determinations. Additionally, the other measurements may be based on information, such as sound signals, obtained from other computing devices, such as pulse echo device 130, cement bond log device 140 and A0 measurement device 150.

For example, CE computing system 110 may receive predicted cement property information (e.g., a value corresponding to the cement property) and predicted microannulus thickness information for a particular medium bonded to a casing (e.g., a value corresponding to the miraculous thickness between cement layer 206 and casing 204 of FIG. 2), such as 5 Mrayl cement. Additionally, CE computing system 110 may determine predicted pulse echo measurements, asymmetric lamb wave measurements, symmetric lamb wave measurements and/or cement bond logging measurements based on the predicted cement property information and predicted microannulus thickness information. In some instances, CE computing system 110 may apply forward modeling techniques (numerically or using a proxy) to the predicted cement property information and predicted microannulus thickness information. Based on the application of the forward modeling techniques to the predicted cement property information and predicted microannulus thickness information, CE computing system 110 may determine predicted pulse echo measurements, asymmetric lamb wave measurements, symmetric lamb wave measurements and/or cement bond logging measurements based on the predicted cement property information. Moreover, CE computing system 110 may obtain the actual pulse echo measurements, asymmetric lamb wave measurements, symmetric lamb wave measurements and/or cement bond logging measurements from pulse echo device 130, A0 measurement device 150, S0 measurement device 120, and/or cement bond log device 140, respectively. Further, CE computing system 110 may compare the predicted to the actual pulse echo measurements, asymmetric lamb wave measurements, symmetric lamb wave measurements and/or cement bond logging measurements. Based on the comparison, CE computing system 110 may determine the difference between the predicted to the actual pulse echo measurements, asymmetric lamb wave measurements, symmetric lamb wave measurements and/or cement bond logging measurements and determine whether the difference is smaller than a threshold value. As described herein, the threshold value may indicate an acceptable error threshold between the predicted to the actual pulse echo measurements, asymmetric lamb wave measurements, symmetric lamb wave measurements and/or cement bond logging measurements.

In instances where CE computing system 110 determines the difference is smaller than the threshold value, CE computing system 110 may determine the predicted and the actual pulse echo measurements, asymmetric lamb wave measurements, symmetric lamb wave measurements and/or cement bond logging measurements match. Additionally, CE computing system 110 may determine the predicted cement property information and the predicted microannulus thickness information is accurate based on determining the predicted and the actual pulse echo measurements, asymmetric lamb wave measurements, symmetric lamb wave measurements and/or cement bond logging measurements match. Further, CE computing system 110 may output data indicating the property of the medium (e.g., the cement) based on the predicted cement property information and the predicted microannulus thickness information.

In instances where CE computing system 110 determines the difference is greater than or equal to the threshold value, CE computing system 110 may determine the predicted and the actual pulse echo measurements, asymmetric lamb wave measurements, symmetric lamb wave measurements and/or cement bond logging measurements do not match. Additionally, based on determining the predicted and the actual pulse echo measurements, asymmetric lamb wave measurements, symmetric lamb wave measurements and/or cement bond logging measurements do not match, CE computing system 110 may adjust the predicted cement property information and the predicted microannulus thickness information. Further, CE computing system 110 may repeat the example processes as described herein to determine whether the adjusted predicted cement property information and the adjusted predicted microannulus thickness information is accurate.

In some instances, executed evaluation engine 116 may obtain, from cement bond log device 140, sound signals detected by a receiver of cement bond log device 140 that were propagating and attenuating through a medium. The medium may be the same medium of the measurement data. Additionally, the sound signals may originate from a sound projected by a transducer of the cement bond log device 140, and the projected sound may be of a lower frequency than the frequency indicated in the measurement data (e.g., 20-30 kHz). Moreover, executed evaluation engine 116 may determine a waveform corresponding to the sound signals detected by cement bond log device 140 and determine one or more cement bond log measurements or characteristics associated with the waveform, such as the amplitude of the waveform. Further, executed evaluation engine 116 may determine one or more additional cement bond log measurements, such as the bond quality of the medium (e.g., the bond quality between a casing and cement), based on the one or more cement bond log measurements. For instance, executed evaluation engine 116 may determine for waveforms of sound signals obtained from mediums that have lower amplitudes, the bond quality of the casing and cement may be stronger compared to waveforms of sound signals obtained from mediums that have higher amplitudes. In some instances, executed evaluation engine 116 may perform operations that store, within the one or more tangible non-transitory memories of CE computing system 110, such as cement bond log database 113 of data repository 112, the sound signal generated and received from cement bond log device 140 and corresponding cement bond log measurements.

In other instances, executed evaluation engine 116 may obtain, from pulse echo device 130, sound signals detected by a receiver of pulse echo device 130 may be propagating and attenuating through a medium. The medium may be the same medium of the measurement data. Additionally, the sound signals may originate from a sound projected by a transducer of pulse echo device 130, and the projected sound may be an ultrasonic frequency (e.g., 200-300 kHz). Moreover, executed evaluation engine 116 may determine a waveform corresponding to the sound signals detected by pulse echo device 130 and determine one or more pulse echo measurements or characteristics associated with the waveform, such as the amplitude of the waveform. Further, executed evaluation engine 116 may determine additional pulse echo measurements, such as the depth or impedance of the medium (e.g., the depth or impedance between a casing and cement), based on the one or more pulse echo measurements. In some instances, executed evaluation engine 116 may perform operations that store, within the one or more tangible non-transitory memories of CE computing system 110, such as pulse echo database 114 of data repository 112, the sound signal generated and received from pulse echo device 130 and corresponding pulse echo measurements.

In various instances, executed evaluation engine 116 may obtain, from A0 measurement device 150, sound signals detected by a receiver of A0 measurement device 150 may be propagating and attenuating through a medium. The medium may be the same medium of the measurement data. Additionally, the sound signals may originate from a sound projected by a transducer of A0 measurement device 150, and the projected sound may be an ultrasonic frequency (e.g., 200-300 kHz). Moreover, the projected sound may be projected at an angle, such as an angle between 0 degrees with respect to a horizontal plane or axis and 35 degrees above the horizontal plane or axis. The sound signals that are propagating and attenuating through the medium may include an A0 measurement wave or asymmetric (e.g., A0) lamb waves. As described herein, the asymmetric lamb waves may indicate the type of material behind the casing of the medium, such as gas, liquid or solid. Additionally, executed evaluation engine 116 may determine a waveform corresponding to the sound signals detected by A0 measurement device 150 and determine one or more asymmetric lamb wave measurements or characteristics associated with the waveform, such as the amplitude of the waveform. Further, executed evaluation engine 116 may determine one or more additional asymmetric lamb wave measurements, such as the type of material behind the casing of the medium (e.g., cement) based on the one or more asymmetric lamb wave measurements. For instance, executed evaluation engine 116 may determine a vibrational energy of the sound signals based on the sound signals. Additionally, executed evaluation engine 116 may determine the type of material based on how large the vibrational energy is. In some instances, each type of material may be associated with a predetermined range of vibrational energy. As such, executed evaluation engine 116 may determine the material is gas if the vibrational energy is within a first range of vibrational energy, the material is liquid if the vibrational energy is within a second range of vibrational energy, and the material is solid if the vibrational energy is within a third range of vibrational energy. In such instances, the first range of vibrational energy may be higher than the second range of vibrational energy and the third range of vibrational energy and the second range of vibrational energy is higher than the third range of vibrational energy. In other instances, executed evaluation engine 116 may perform operations that store, within the one or more tangible non-transitory memories of CE computing system 110, such as A0 measurement database 115 of data repository 112, the sound signal generated and received from A0 measurement device 150 and corresponding asymmetric lamb wave measurements.

Figure 6:
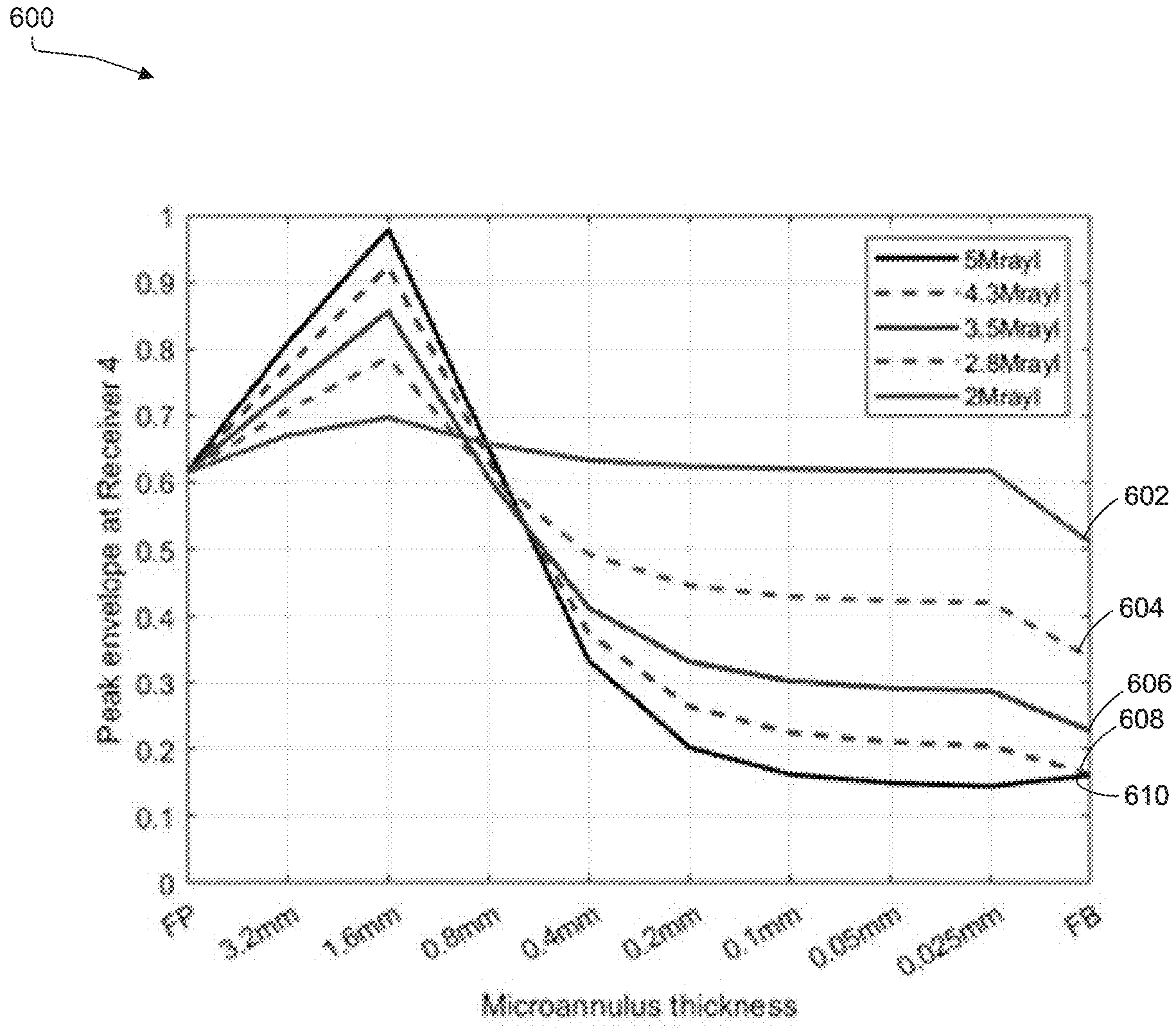
FIG. 6 illustrates an example graph illustrating peak amplitudes of energy detected by a receiver of an A0 measurement detection device as it passes through mediums with various microannulus thicknesses, according to some examples of the present disclosure.

In some instances, the asymmetric lamb waves may be sensitive to a change of a thickness of a microannulus formation. In such instances, the response may be more prominent than that of a symmetric lamb wave. For example, and referring to FIG. 6, example graph 600 illustrates the peak amplitudes of asymmetric lamb wave dominant ultrasonic sound waves or signals propagating and attenuating through mediums with various types of annulus materials. Additionally, the sound waves or signals may be detected by a receiver of an A0 measurement device, such as A) measurement device 150, and may include asymmetric lamb waves. As illustrated in FIG. 6, graph 600 may include peak amplitudes of a detected asymmetric dominant ultrasonic sound wave 602, asymmetric dominant ultrasonic sound wave 604, asymmetric dominant ultrasonic sound wave 606, asymmetric dominant ultrasonic sound wave 608 and asymmetric dominant ultrasonic sound waves 610. Additionally, asymmetric dominant ultrasonic sound wave 602, asymmetric dominant ultrasonic sound wave 604, asymmetric dominant ultrasonic sound wave 606, asymmetric dominant ultrasonic sound wave 608 and asymmetric dominant ultrasonic sound waves 610 may have propagated and attenuated through a 5 Mrayl cement, a 4.3 Mrayl cement, a 3.5 Mrayl cement, a 2.8 Mrayl cement, and a 2 Mrayl cement, respectively. Moreover, the detected sound signals may each have originated from an ultrasonic sound projected at the same frequency, such as 200 kHz, to the corresponding medium. Further, each of the detected sound signals may be projected to corresponding mediums at the same angle, such as a 30 degree angle above a horizontal plane or axis. As indicated by graph 600, a change in the peak amplitude of each detected asymmetric lamb wave dominant ultrasonic sound wave is relatively small and behaves differently for lighter and heavier cement. Additionally, there is an increase am peak amplitude between 3.2 mm to 1.6 mm microannulus thicknesses and a steep drop between 0.2 mm and 1.6 mm microannulus thicknesses.

Figure 7:
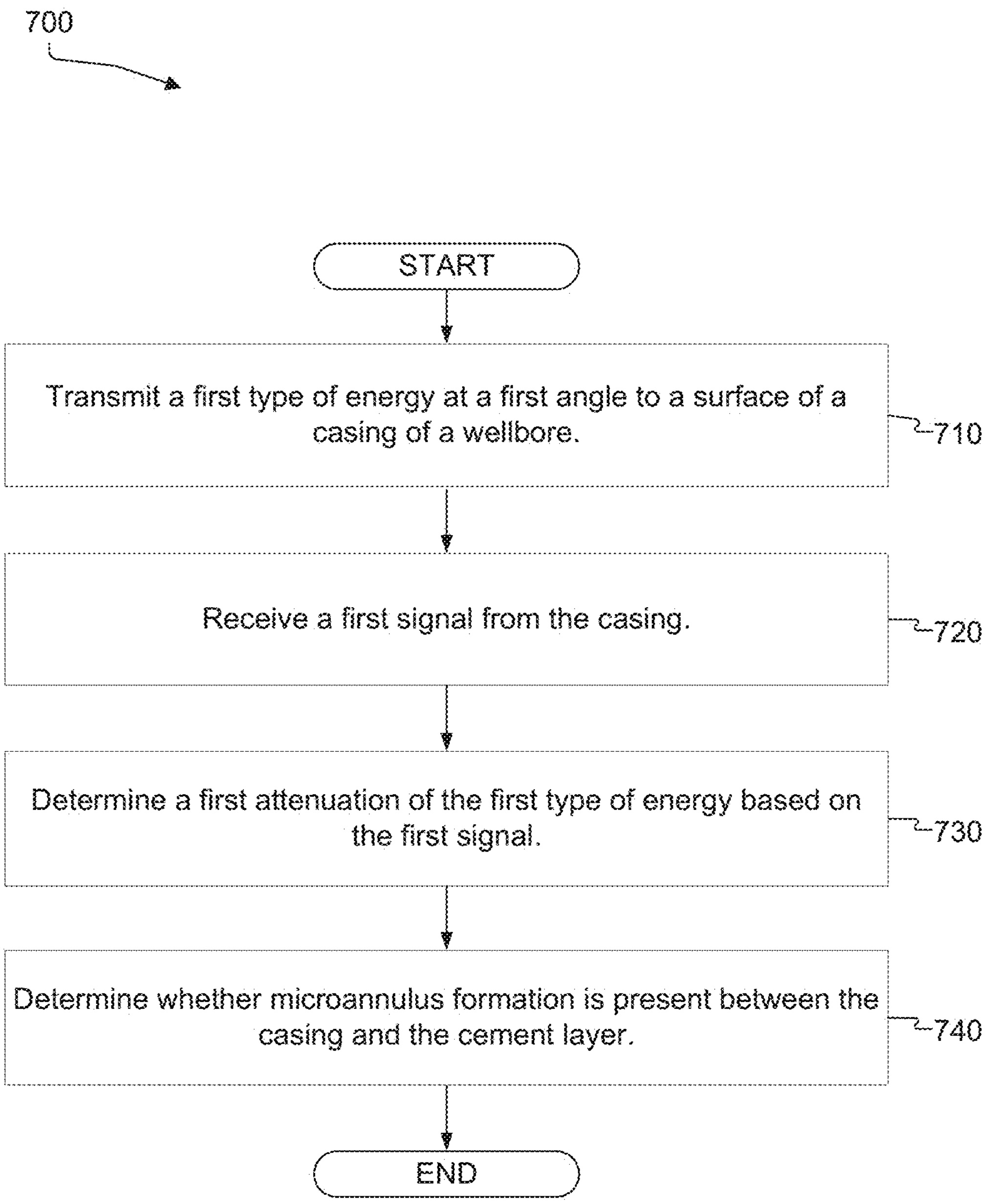
FIG. 7 illustrates a flow chart of an exemplary process for determining the presence of a microannulus formation, according to some examples of the present disclosure.

FIG. 7 is a flow chart of example process 700 for determining whether a microannulus formation is present in a medium (e.g., a casing and cement bonded to the casing). In some instances, one or more components of computing environment 100 may perform all or a portion of the steps of example process 700, which include but are not limited to transmitting a first type of energy at a first angle to a surface of a casing of a wellbore, receiving a first signal from the casing, determining a first attenuation of the first type of energy based on the first signal, and determining whether a microannulus formation is present between the casing and the cement layer.

Referring to FIG. 7, CE computing system 110 may cause S0 measurement device 120 to transmit a first type of energy at a first angle to a surface of a casing of a wellbore (e.g., step 710). In some examples, executed evaluation engine 116 may transmit instructions to S0 measurement device 120 over one or more communications networks, such as communications network 160, and via a communications interface or unit of S0 measurement device 120. Additionally, the instructions may indicate a frequency the one or more transducers, such as transducer 212, of S0 measurement device 120 may project sound at. As described herein, the frequency may be within an ultrasonic frequency range (e.g., 200 kHz to 300 kHz). Moreover, the instructions may indicate an angle the one or more transducers of S0 measurement device 120 is to project or transmit the sound towards a medium (e.g., casing 204 and cement layer 206 of FIG. 2). In some instances, the angle may be between 0 degrees with respect to a horizontal plane or axis and 35 degrees above the horizontal plane or axis. Further, one or more processors of S0 measurement device 120 may cause the one or more transducers to project the sound at the frequency and angle indicated in the instructions.

As described herein, the sound projected onto the medium may propagate and attenuate through the medium. Additionally, the angle and frequency, such as an angle between 0 degrees with respect to a horizontal plane or axis and 35 degrees above the horizontal plane or axis and a frequency within an ultrasonic frequency range (e.g., 200 kHz to 300 kHz) may cause the sound propagating and attenuating through the medium to include symmetric lamb waves. The symmetric lamb waves, as described herein, may be sensitive to the presence of microannulus formations within the medium (e.g., cement layer 206 bonded to casing 204 of FIG. 2).

Additionally, CE computing system 110 may receive a first sound signal from the casing (e.g., step 720). In some examples, one or more receivers of S0 measurement device 120, such as receiver 210, may detect the sound signal of the projected sound propagating and attenuating through the medium (e.g., casing 204 and cement layer 206). As described herein, the sound signal propagating and attenuation through the medium may include symmetric lamb waves. Additionally, the one or more processors may transmit the detected sound signal to executed evaluation engine 116. In some examples, S0 measurement device 120 may transmit original sound data identifying and characterizing the frequency of the originally projected sound that corresponds to the sound signal and the angle at which the originally projected sound was projected at by one or more transducers of S0 measurement device 120.

In some examples, CE computing system 110 may adjust the angle at which a receiver of S0 measurement device 120 may detect the sound signal propagating through the medium. In such examples, CE computing system 110 may transmit instructions to S0 measurement device 120 over one or more communications networks, such as communications network 160, and via a communications interface or unit of S0 measurement device 120. The instructions may indicate the angle that one or more receivers of S0 measurement device 120 is to detect the sound signal from the medium. Additionally, the communications interface may route the instructions to one or more processors of S0 measurement device 120. The one or more processors may cause an electrical or mechanical component of one or more receivers of S0 measurement device 120 to adjust the angle of the corresponding receiver in accordance with the angle indicated in the instructions. In some instances, the instructions may be based on a user provided input. In other instances, the angle can also be set manually before the logging and fixed during the logging.

Referring to FIG. 7, CE computing system 110 may determine a first attenuation of the first type of energy based on the first signal (e.g., step 730). In some examples, executed evaluation engine 116 may receive the sound signal from S0 measurement device 120. Additionally, executed evaluation engine 116 may determine a waveform of the sound signal generated by S0 measurement device 120. Moreover, executed evaluation engine 116 may determine one or more measurements or characteristics of the waveform, such as one or more amplitudes. The waveform may represent the attenuation of the sound signal detected by S0 measurement device 120. Further, executed evaluation engine 116 may generate measurement data that identifies and characterizes the one or more measurements of the determined waveform. In some instances, measurement data may include one or more portions of the original sound data. In such instances, measurement data may identify and characterize the frequency of the corresponding originally projected sound and/or the angle at which the originally projected sound was projected at.

Additionally, CE computing system 110 may determine whether a microannulus formation is present between the casing and the cement layer (e.g., step 740). In some examples, executed evaluation engine 116 may determine whether a microannulus formation is present in a medium (e.g., a casing and cement bonded to the casing) the measurement data is associated with. In some examples, executed evaluation engine 116 may determine whether a microannulus formation is present in the medium associated with the measurement data based on the measurement data and reference data. As described herein, reference data may be stored in S0 measurement database 117 and may include a record of determined measurements of waveforms for different mediums. For example, the record of reference data may identify one or more mediums. Additionally, the record may identify and characterize, for each of the one or more mediums, the dimensions of the casing and the material the casing is bonded to, such as cement, one or more measurements of a waveform determined for the medium, the waveform, a frequency of an originally projected sound the waveform corresponds to, and an angle the originally projected sound is projected from. In some instances, may compare the measurement data with the reference data. Additionally, executed evaluation engine 116 may determine whether a microannulus formation is present in the in a medium (e.g., a casing and cement bonded to the casing) the measurement data is associated with, based on the comparison between the measurement data and the reference data.

Figure 8:
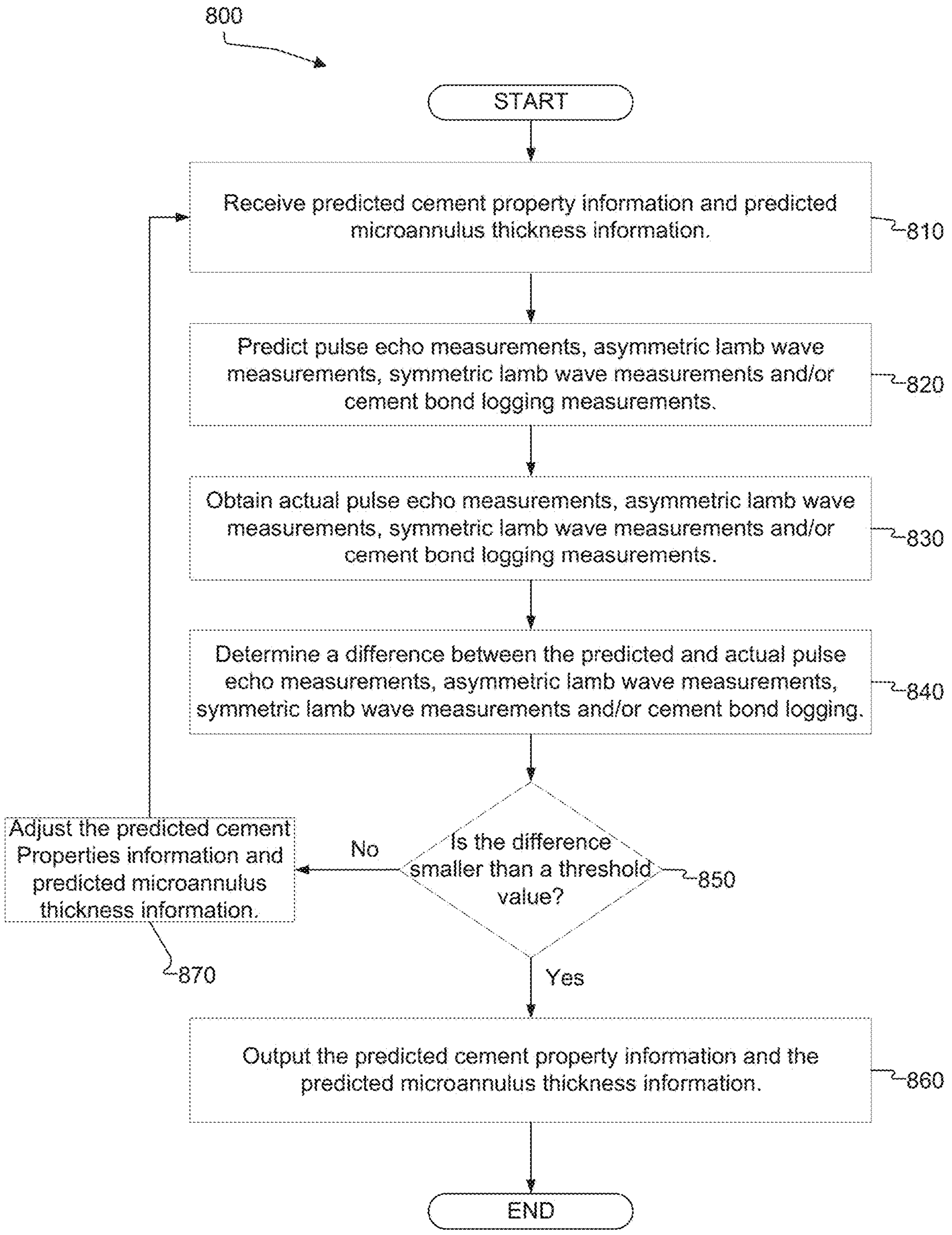
FIG. 8 illustrates a flow chart of an exemplary process for determining cement property information and microannulus thickness information, according to some examples of the present disclosure.

FIG. 8 is a flow chart of example process 800 for determining the quality of the cementation, detecting a presence of microannulus formations within the medium, and in some instances, calculating an impedance of the medium and estimating the microannulus thickness. In some instances, one or more components of computing environment 100 may perform all or a portion of the steps of example process 800, which include but are not limited to receiving predicted cement property information and predicted microannulus thickness information, predicting pulse echo measurements, asymmetric lamb wave measurements, symmetric lamb wave measurements and/or cement bond logging measurements, obtaining actual pulse echo measurements, asymmetric lamb wave measurements, symmetric lamb wave measurements and/or cement bond logging measurements, determining a difference between the predicted and actual pulse echo measurements, asymmetric lamb wave measurements, symmetric lamb wave measurements and/or cement bond logging, determining whether the difference is smaller than a threshold value, and based on determining whether the difference is smaller than the threshold value, outputting the predicted cement property information and the predicted microannulus thickness information or adjusting the predicted cement properties information and predicted microannulus thickness information.

Referring to FIG. 8, CE computing system 110 may receive predicted cement property information and predicted microannulus thickness information (e.g., step 810). Additionally, CE computing system 110 may predict pulse echo measurements, asymmetric lamb wave measurements, symmetric lamb wave measurements and/or cement bond logging measurements (e.g., step 820). In some examples, CE computing system 110 may apply forward modeling techniques (numerically or using a proxy) to the predicted cement property information and predicted microannulus thickness information. Based on the application of the forward modeling techniques to the predicted cement property information and predicted microannulus thickness information, CE computing system 110 may determine predicted pulse echo measurements, asymmetric lamb wave measurements, symmetric lamb wave measurements and/or cement bond logging measurements based on the predicted cement property information.

Moreover, CE computing system 110 may obtain actual pulse echo measurements, asymmetric lamb wave measurements, symmetric lamb wave measurements and/or cement bond logging measurements (e.g., step 830). As described herein, CE computing system 110 may obtain the actual pulse echo measurements, asymmetric lamb wave measurements, symmetric lamb wave measurements and/or cement bond logging measurements from pulse echo device 130, A0 measurement device 150, S0 measurement device 120, and/or cement bond log device 140, respectively.

Further, CE computing system 110 may determine a difference between the predicted and actual pulse echo measurements, asymmetric lamb wave measurements, symmetric lamb wave measurements and/or cement bond logging (e.g., step 840). Additionally, CE computing system 110 may determine whether the difference is smaller than a threshold value (e.g., step 850). In instances where CE computing system 110 determines the difference is smaller than the threshold value, CE computing system 110 may output the predicted cement property information and the predicted microannulus thickness information (e.g., step 870). In some instances, CE computing system 110 may determine the predicted and the actual pulse echo measurements, asymmetric lamb wave measurements, symmetric lamb wave measurements and/or cement bond logging measurements match. Additionally, CE computing system 110 may determine the predicted cement property information and the predicted microannulus thickness information is accurate based on determining the predicted and the actual pulse echo measurements, asymmetric lamb wave measurements, symmetric lamb wave measurements and/or cement bond logging measurements match. Further, CE computing system 110 may output data indicating the property of the medium (e.g., the cement) based on the predicted cement property information and the predicted microannulus thickness information.

In instances where CE computing system 110 determines the difference is greater than or equal to the threshold value, CE computing system 110 may adjust the predicted cement properties information and predicted microannulus thickness information (e.g., step 870). In some instances, CE computing system 110 may determine the predicted and the actual pulse echo measurements, asymmetric lamb wave measurements, symmetric lamb wave measurements and/or cement bond logging measurements do not match. Additionally, based on determining the predicted and the actual pulse echo measurements, asymmetric lamb wave measurements, symmetric lamb wave measurements and/or cement bond logging measurements do not match, CE computing system 110 may adjust the predicted cement property information and the predicted microannulus thickness information. Further, CE computing system 110 may repeat example process 800 as described herein to determine whether the adjusted predicted cement property information and the adjusted predicted microannulus thickness information is accurate.

A. Multi-Modal S0 Measurement Device with Centered Sensors.

In some examples, S0 measurement device 120 may be configured to cause symmetric lamb waves and asymmetric lamb waves. Additionally, executed evaluation engine 116 may determine the material behind the casing of the medium and whether a microannulus formation is present in the medium based on sound signals from S0 measurement device 120. In such examples, S0 measurement device 120 may operate in multiple modes. Additionally, each mode may be associated with one or more transducers of S0 measurement device 120 being configured in a particular angle. As described herein, the one or more transducers may project sound at the medium (e.g., the casing and the cement) at an ultrasonic frequency (e.g., 200 kHz to 300 kHz), and the angle at which the one or more transducers may project sound may cause the generation of symmetric lamb waves and/or asymmetric lamb waves within the medium. Further, executed evaluation engine 116 may cause S0 measurement device 120 to operating in a particular mode while S0 measurement device 120 is traveling in a particular direction within a wellbore.

By way of example, and referring to FIG. 2, S0 measurement device 120 may travel in a first direction (e.g., down wellbore 202). Additionally, executed evaluation engine 116 may transmit an instruction to S0 measurement device 120. The instruction may cause S0 measurement device 120 to adjust the angle of transducer 212 to a first angle, such as 10 degrees above the horizontal plane or axis (e.g., x-axis). Additionally, the instruction may indicate and cause S0 measurement device 120 to project an ultrasonic sound (e.g., 200 kHz) to casing 204 and cement layer 206. As described herein, the propagating and attenuating sound signals passing through casing 204 and cement layer 206 may include symmetric lamb waves. Moreover, S0 measurement device 120 may project the ultrasonic sound to casing 204 and cement layer 206 while S0 measurement device 120 travels in the first direction. Further, receiver 210 may detect the sound signals propagating and attenuating through casing 204 and cement layer 206 while S0 measurement device 120 travels in the first direction. The detected sound signal may be transmitted to executed evaluation engine 116.

Additionally, S0 measurement device 120 may travel in a second direction (e.g., up wellbore 202). Moreover, executed evaluation engine 116 may transmit an instruction to S0 measurement device 120. The instruction may cause S0 measurement device 120 to adjust the angle of transducer 212 to a first angle, such as 35 degrees above the horizontal plane or axis (e.g., x-axis). Additionally, the instruction may indicate and cause S0 measurement device 120 to project an ultrasonic sound (e.g., 200 kHz) to casing 204 and cement layer 206. As described herein, the propagating and attenuating sound signals passing through casing 204 and cement layer 206 may include A0 measurement waves. Moreover, S0 measurement device 120 may project the ultrasonic sound to casing 204 and cement layer 206 while S0 measurement device 120 travels in the second direction. Further, receiver 210 may detect the sound signals propagating and attenuating through casing 204 and cement layer 206 while S0 measurement device 120 travels in the second direction. The detected sound signal may be transmitted to executed evaluation engine 116.

Figure 9:
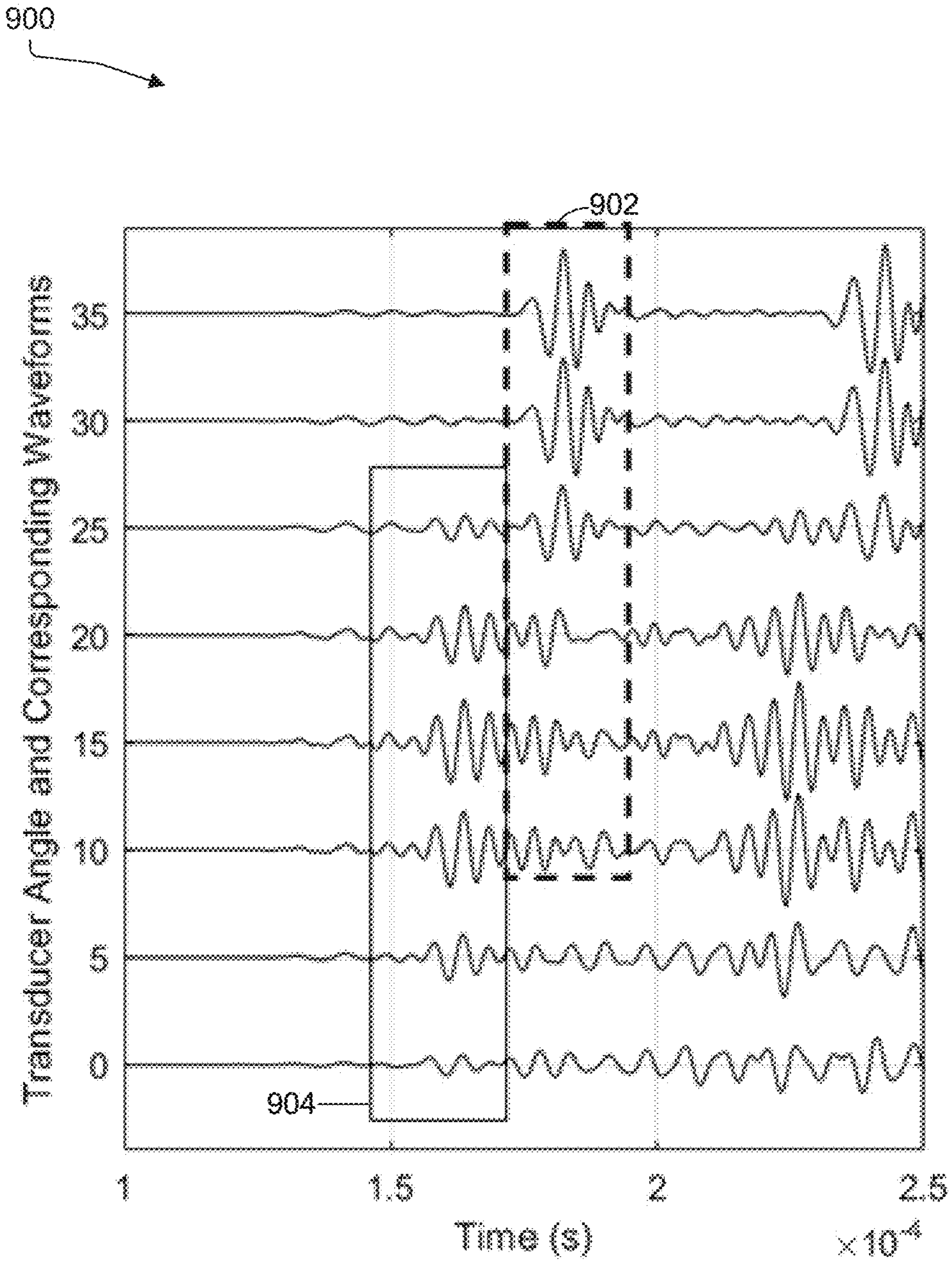
FIG. 9 illustrates an example graph illustrating the generation of different wave modes as the energy is projected at various angles, according to some examples of the present disclosure.

Referring to FIG. 9, the angle at which the sound is projected from S0 measurement device 120 may cause the generation of symmetric lamb waves and/or A0 measurement waves in the medium (e.g., the casing and the cement). For example, as illustrated in graph 900 of FIG. 9, one or more transducers of S0 measurement device 120 may project or transmit a sound at an ultrasonic frequency towards a medium. The detected sound signal may include symmetric lamb wave 904 between angles 0 degrees to 25 degrees above a horizontal plane or axis and asymmetric lamb wave 902 between angles 10 to 35 degrees above the horizontal plane or axis. In examples where the sound signal includes both symmetric lamb wave 904 and asymmetric lamb wave 902, executed evaluation engine 116 may determine and identify symmetric lamb wave 904 and asymmetric lamb wave 902 based on the respective time frames.

B. Pad-Based S0 Measurement Device for Cement Bonding and Integrity Evaluation.

In some examples, examining cement bonding and integrity could be challenging and complicated because of the existence of eccentric casing (e.g., a thick casing), cement azimuthal heterogeneity and the presence of microannulus. In such examples, current cement bonding techniques, such as CBL techniques, cannot provide accurate quantitative evaluation in an azimuthal perspective or resolution. A pad-based S0 measurement device may be configured to provide accurate quantitative evaluation in an azimuthal perspective or resolution.

In some instances, the pad-based S0 measurement device may include one or more transducers and one or more receivers, and the pad-based S0 measurement device may be placed against the surface of a casing of a wellbore. In such instances, the pad-based S0 measurement device may be configured (e.g., cut) in a way that prevents waves propagating along the pad and to minimize the influence of pad on the casing wave propagation. Additionally, the pad-based S0 measurement device may be placed onto the surface of the casing using one or more mechanical arms. Further, the pad-based S0 measurement device may be mechanically coupled to the surface of the casing using pads during logging operations. That way, sound signals detected by the receiver of the pad-based S0 measurement device may bypass any wellbore fluids, such as mud, and eliminating fluid attenuation effects to ensure a more accurate cement bond and integrity evaluation.

Figure 10:
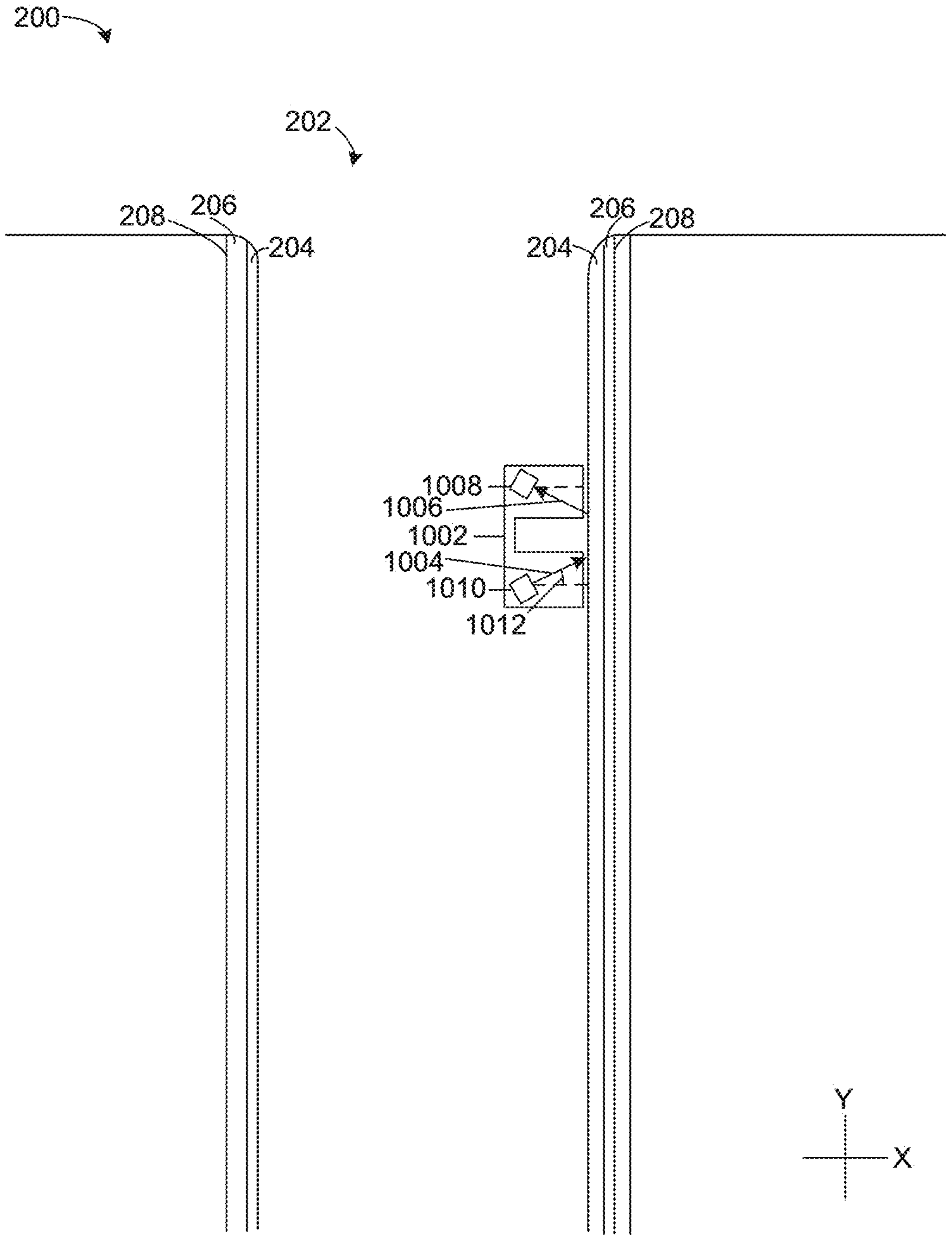
FIG. 10 illustrates an example pad-based S0 measurement device within an example wellbore according to some examples of the present disclosure.

For instance, and referring to FIG. 10, environment 200 may include pad-based S0 measurement device 1002 within wellbore 202. In some instances, wellbore 202 may be filled with fluid that may carry energy to and from casing 204. Additionally, environment 200 may include cement layer 206 that is between the surface 208 of wellbore 202 and casing 204. Moreover, pad-based S0 measurement device 1002 may include one or more transducers 1010 and receivers 1008. Further, pad-based S0 measurement device 1002 may be coupled to or attached to the surface of casing 204. Additionally, transducer 1010 and receiver 1008 maybe adjusted to different angles, for measuring different modes, for example the symmetric lamb waves or the asymmetric lamb waves.

In other instances, the transducers and the receivers may each be in separate pads, such as, a receiver pad may include the receiver while a transducer pad may include the transducer. Additionally, the transducer pad including a transducer and the receiver pad including the receiver may be placed onto the surface of the casing using one or more mechanical arms. Further, the transducer pad including a transducer and the receiver pad including the receiver may be mechanically coupled to the surface of the casing during logging operations. That way, sound signals detected by the receiver may bypass any wellbore fluids, such as mud, and eliminating fluid attenuation effects to ensure a more accurate cement bond and integrity evaluation.

Figure 11:
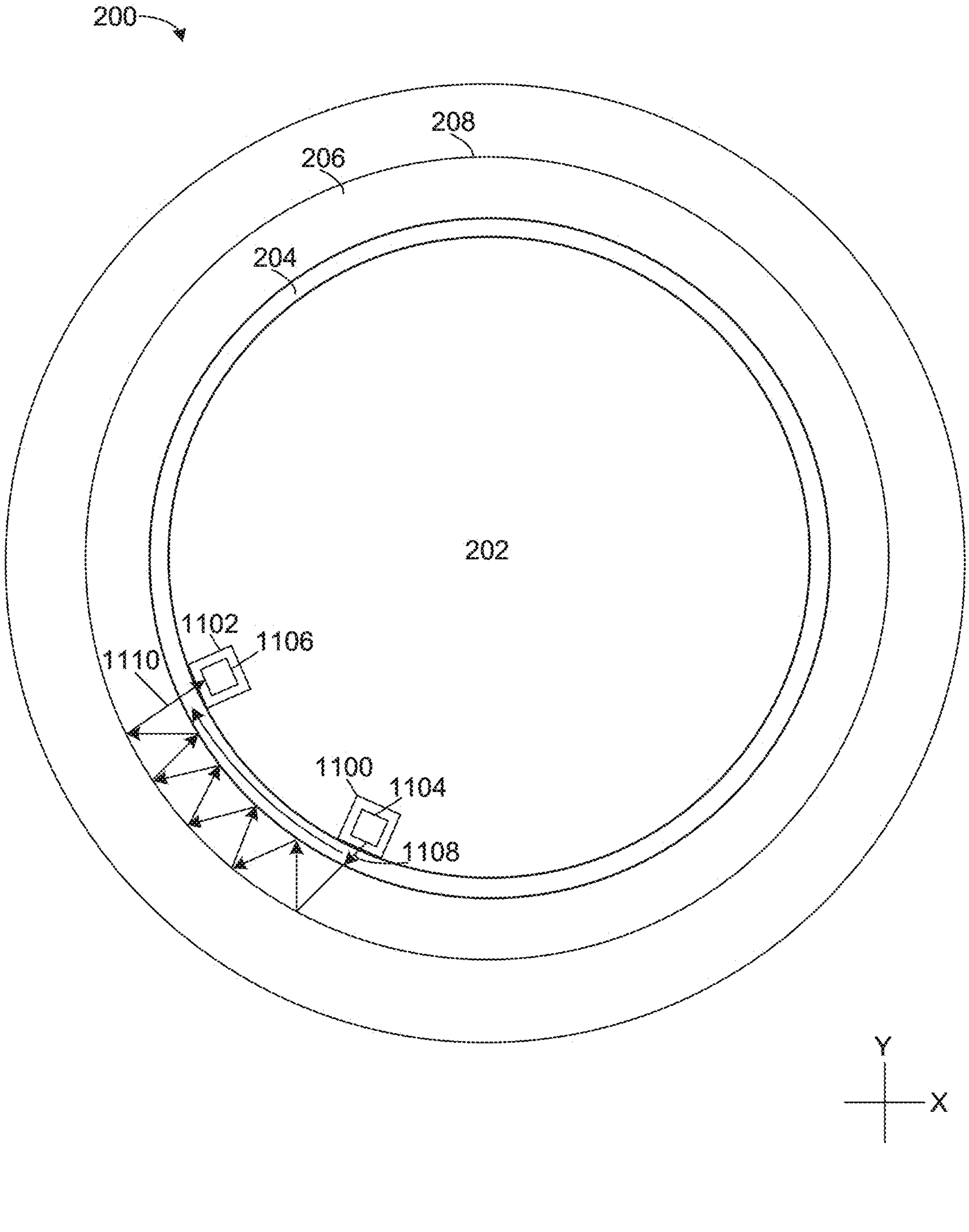
FIG. 11 illustrates an example pad-based S0 measurement device within an example wellbore according to some examples of the present disclosure.

For instance, and referring to FIG. 11, a top down view of environment 200 may include transducer pad 1100 and receiver pad 1102 within wellbore 202. Additionally, environment 200 may include cement layer 206 that is between the surface 208 of wellbore 202 and casing 204. Moreover, transducer pad 1100 may include transducer 1104 and receiver pad 1102 may include receiver 1106. Further, transducer pad 1100 and receiver pad 1102 may be coupled to or attached to the surface of casing 204.

As described herein, and similar to transducer 212, the transducer of the pad-based S0 measurement device, such as transducer 1010 and transducer 1104, may transmit or project sound towards a casing (e.g., casing 204 of FIG. 10), such as sound 1108. Additionally, and similar to receiver 210, the receivers of the pad-based S0 measurement device, such as receiver 1008 and receiver 1106, may detect a sound signal of the projected sound propagating and attenuating through the casing and medium (e.g., casing 204 and cement layer 206 of FIG. 10), such as sound signal 1110. In some instances, the transducer of the pad-based S0 measurement device may transmit or project sound in ultrasonic frequencies, such as 200 kHz to 300 kHz. For instance, transducer 1104 may transmit or project sound 1108 in ultrasonic frequencies. Additionally, the transducer of the pad-based S0 measurement device may transmit or project sound at an angle above a plane or axis. For instance, transducer 1104 may transmit or project sound 1108 at an angle above a plane or axis (e.g., an angle between 0 degrees above a plane or axis and 35 degrees above the plane or axis). Moreover, the sound signal (e.g., sound signal 1110 of FIG. 11) propagating and attenuating through casing 204 and cement layer 206 may include lamb waves, as described herein, such as symmetric and/or asymmetric lamb waves. As described herein, the asymmetric lamb waves may be sensitive to the material behind the casing, such as cement layer 206. Additionally, the symmetric lamb waves may be sensitive to the presence and thickness of microannulus formations that may be present between the casing and the medium (e.g., casing 204 and cement layer 206).

Figure 12A:
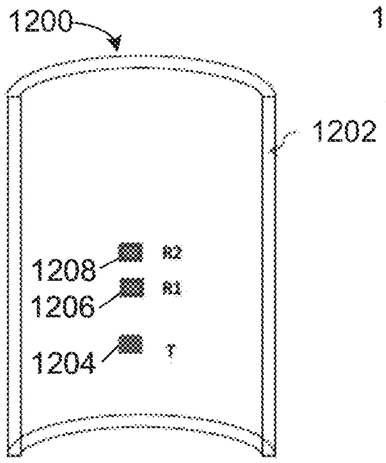
FIGS. 12A, 12B, and 12C illustrates additional configurations of the pad-based S0 measurement device.
Figure 12B:
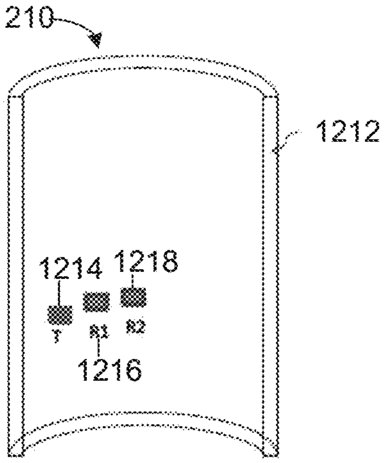
Figure 12C:
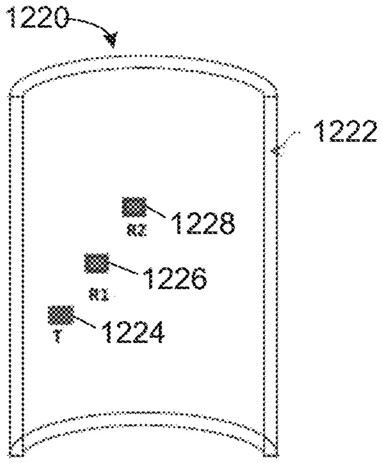

Referring to FIGS. 12A, 12B and 12C, environment 1200, environment 1210 and environment 1020 illustrate various configurations of a transducer pads and receiver pads. For example, as illustrated in FIG. 12A, environment 1200 may include casing 1202, transducer pad 1204, receiver pad 1206 and receiver pad 1208 in an axial configuration. Although FIG. 12A illustrates two receiver pads, any number of receiver pads may be utilized. Additionally, transducer pad 1204 may include a transducer, similar to transducer 212, transducer 1010, and transducer 1104, while the receiver pads, such as receiver pad 1206 and receiver pad 1208, may include a receiver, similar to receiver 210, receiver 1008 and transducer 1104.

In another example, and as illustrated in FIG. 12B, environment 1210 may include casing 1212, transducer pad 1214, receiver pad 1216 and receiver pad 1218 in an azimuthal configuration. Although FIG. 12B illustrates two receiver pads, any number of receiver pads may be utilized. Additionally, transducer pad 1214 may include a transducer, similar to transducer 212, transducer 1010, and transducer 1104, while the receiver pads, such as receiver pad 1216 and receiver pad 1218, may include a receiver, similar to receiver 210, receiver 1008 and transducer 1104.

In yet another example, and as illustrated in FIG. 12C, environment 1220 may include casing 1222, transducer pad 1224, receiver pad 1226 and receiver pad 1228 in a diagonal configuration. Although FIG. 12C illustrates two receiver pads, any number of receiver pads may be utilized. Additionally, transducer pad 1224 may include a transducer, similar to transducer 212, transducer 1010, and transducer 1104, while the receiver pads, such as receiver pad 1226 and receiver pad 1228, may include a receiver, similar to receiver 210, receiver 1008 and transducer 1104.

Additionally, CE computing system 110, such as executed evaluation engine 116, may obtain from the receiver, either from receiver pad or pad-based S0 measurement device, a sound signal, such as sound signal 606 or sound signal 1110, propagating and attenuating through casing 204 and cement layer 206. As described herein, sound signal 606 and/or sound signal 1110 may include symmetric lamb waves and/or asymmetric lamb waves. Moreover, CE computing system 110 may determine a waveform of the detected sound signal. In some instances, the sound signal may include multiple waves over a duration of time and each wave may correspond to a reflection of a corresponding lamb wave onto casing 204. Moreover, CE computing system 110 may determine one or more measurements or characteristics of each of the waves of the waveform, such as a one or more amplitudes. The waveform may represent the attenuation of the sound signal, such as an attenuation of a symmetric lamb wave and/or an attenuation of asymmetric lamb wave. In some instances, CE computing system 110 may generate measurement data that identifies and characterizes the one or more measurements of each of the waves of the determined waveform.

Moreover, CE computing system 110, such as executed evaluation engine 116, may determine the bond and integrity of the cement based on the measurement data, such as whether the cement and the casing have any microannulus formations and/or the type and/or make up of the medium or material behind the casing (e.g., cement layer 206 of FIG. 10). In some instances, the one or more measurements of one or more waves of the waveform may be utilized to determine a bonding condition and integrity of the cement. Additionally, the phase or travel time difference between waves, such as the first wave in time and the second wave in time, may provide information on the cement thickness while the amplitude change, peak frequency change, the reflected coefficient ad the minimum of the reflection spectrum reveal the bonding condition and integrity of the cement.

In other instances, CE computing system 110, such as executed evaluation engine 116, may perform any of the example operations to determine whether microannulus formations are present between the casing and the medium (e.g., casing 294 and cement layer 206). As described herein, the measurement data may be associated with a sound (e.g., 1110) that includes lamb waves, such as symmetric lamb waves, or is lamb wave dominant (e.g., the sound is symmetric lamb wave dominant). In such instances, CE computing system 110 may utilize the measurement data to make such determinations. Additionally, executed evaluation engine 116 may determine the presence of the microannulus formation in the medium by comparing the measurement data with the reference data, as described herein. For instance, executed evaluation engine 116 may parse measurement data to determine a frequency of the corresponding originally projected sound (e.g., sounds 1108 of FIG. 11) and/or the angle at which the originally projected sound was projected at. Additionally, executed evaluation engine 116 may identify portions of reference data that identifies similar or matching frequency and/or angle. The identified portions may include one or more measurements or characteristics of wave forms of various casing and cementing compositions. Moreover, CE computing system 110 may compare the one or more measurements identified and characterized by the measurement data with one or more measurements identified and characterized by the identified portions of reference data. Based on the comparison, CE computing system 110 may determine which of the one or more measurements or characteristics of wave forms of various casing and cementing compositions identified and characterized in the identified portions of reference data matches or is similar to the one or more measurements identified and characterized in the measurement data. Such a determination may indicate whether the measurement data indicates the presence of a microannulus formation in the medium.

In various instances, CE computing system 110, such as executed evaluation engine 116, may perform any of the example operations, similar to process 800 of FIG. 8, to determine cement property information and microannulus thickness information. In such instances, cementing computing system 110 may obtain the symmetric lamb wave measurements and symmetric lamb wave measurements from a pad-based S0 measurement device, such as pad-based S0 measurement device 1002 of FIG. 10. Additionally, or alternatively, CE computing system 110 may determine the type of material or medium behind the casing. As described herein, the amplitude or attenuation of the lamb waves may be sensitive to the material behind the casing. Additionally, the measurement data may include one or more measurements of symmetric lamb waves and/or asymmetric lamb waves. Moreover, CE computing system 110 may determine the type of material or medium behind the casing (e.g., whether the material or medium is water, mud, fast cement or slow cement). In some instances, the cement property information may further indicate the type of material (e.g., fast cement or slow cement) behind the casing.

Figure 13:
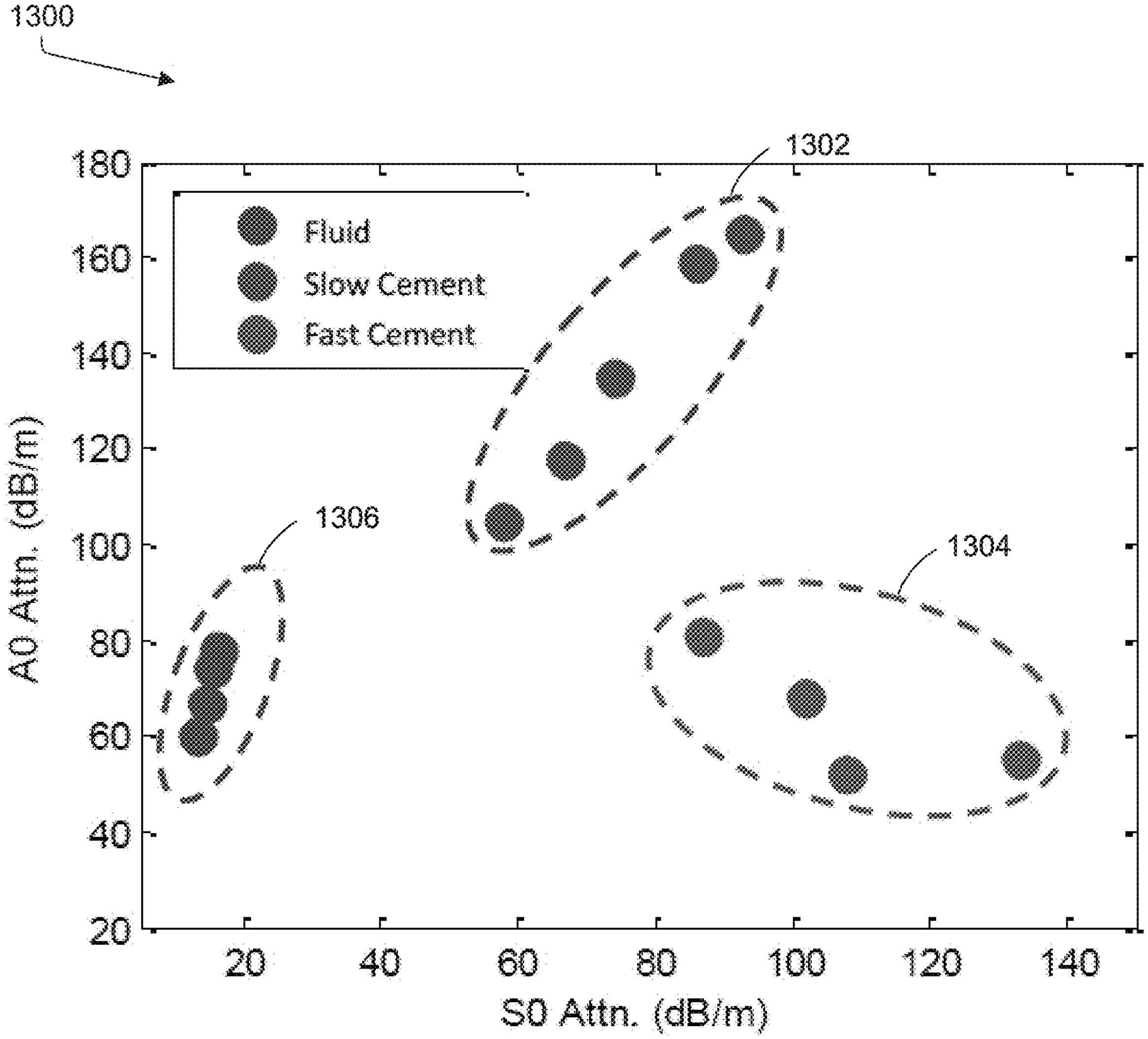
FIG. 13 illustrates an example graph illustrating the sensitivity of lamb waves to a medium behind a casing.

Referring to FIG. 13, example graph 1300 illustrates the sensitivity of the lamb waves, such as the symmetric and/or asymmetric lamb waves, to the material behind the casing. Additionally, example graph 1300 illustrates an example cross plot of asymmetric lamb waves and symmetric lamb waves detected by a pad-based S0 measurement device. As illustrated in FIG. 13, example graph 1300 includes grouping 1302, grouping 1304 and grouping 1306. Each of the grouping 1302, grouping 1304 and grouping 1306 may represent the amplitude of symmetric lamb waves and symmetric lamb waves for various types of material or mediums. For instance, grouping 1302 may be associated with slow cement, grouping 1304 may be associated with fast cement and grouping 1306 may be associated with fluid, such as mud.

Figure 14:
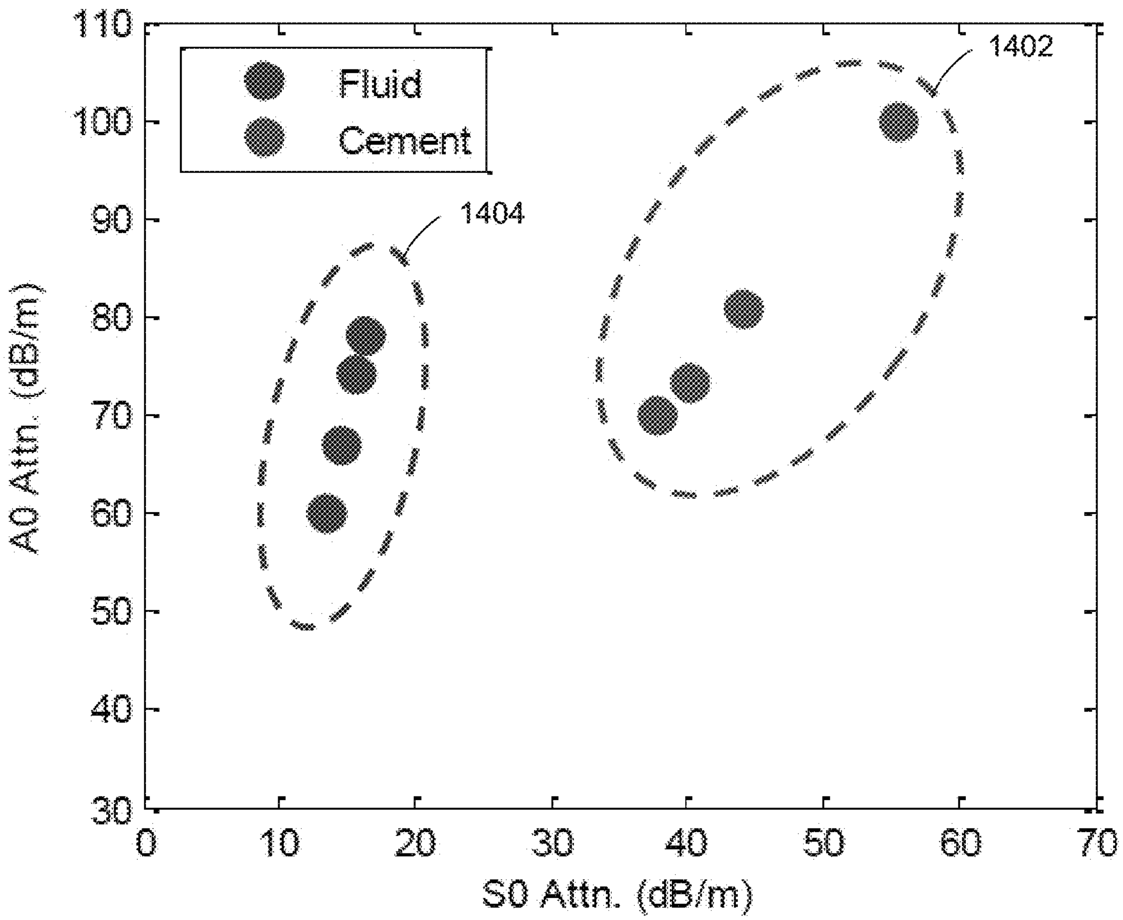
FIG. 14 illustrates another example graph illustrating the sensitivity of lamb waves to a medium behind a casing.

Referring to FIG. 14, example graph 1400 further illustrates the sensitivity of the lamb waves, such as the symmetric and/or asymmetric lamb waves, to the material behind the casing. Additionally, example graph 1400 illustrates an example cross plot of asymmetric lamb waves and symmetric lamb waves detected by a pad-based S0 measurement device. As illustrated in FIG. 14, example graph 1400 includes grouping 1402 and grouping 1404. Each of the grouping 1402 and grouping 1404 may represent the amplitude of symmetric lamb waves and symmetric lamb waves for various types of material or mediums. For instance, grouping 1402 may be associated with cement, and grouping 1404 may be associated with fluid, such as mud.

C. Example Hardware and Software Implementations

Figure 15:
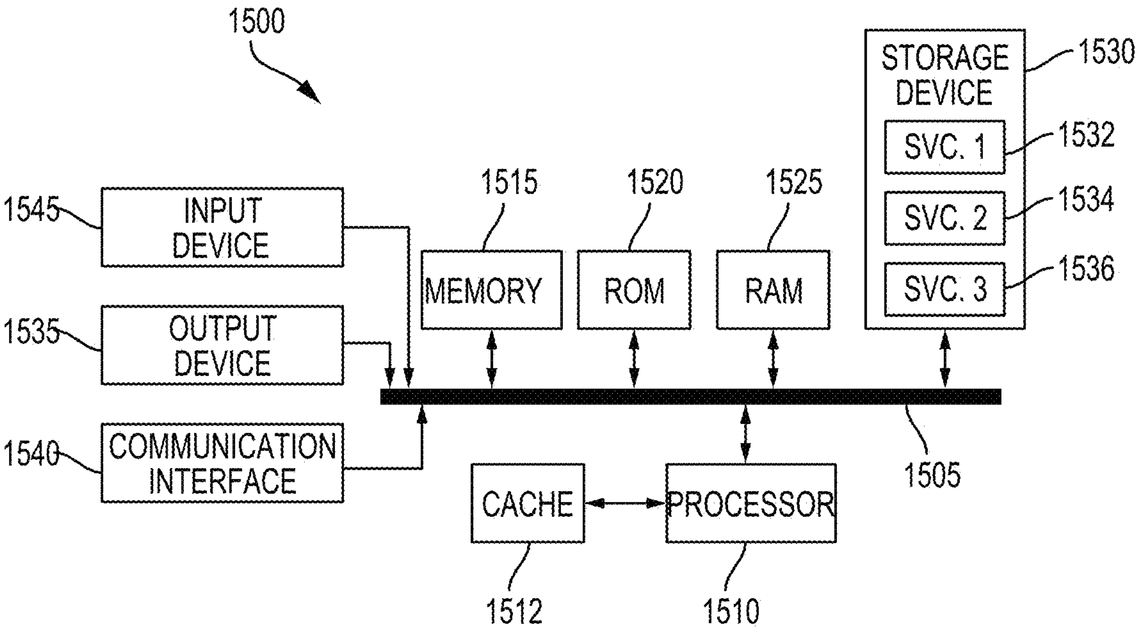
FIG. 15 illustrates an example processor-based system with which some aspects of the subject technology can be implemented.

FIG. 15 illustrates an example computing device architecture 1500 which can be employed to perform various steps, methods, and techniques disclosed herein. Specifically, the computing device architecture can be integrated with the electromagnetic imager tools described herein. Further, the computing device can be configured to implement the techniques of controlling borehole image blending through machine learning described herein.

As noted above, FIG. 15 illustrates an example computing device architecture 1500 of a computing device, such as CE computing system 110, which can implement the various technologies and techniques described herein. The components of the computing device architecture 1500 are shown in electrical communication with each other using a connection 1505, such as a bus. The example computing device architecture 1500 includes a processing unit (CPU or processor) 1510 and a computing device connection 1505 that couples various computing device components including the computing device memory 1515, such as read only memory (ROM) 1520 and random access memory (RAM) 1525, to the processor 1510.

The computing device architecture 1500 can include a cache of high-speed memory connected directly with, in close proximity to, or integrated as part of the processor 1510. The computing device architecture 1500 can copy data from the memory 1515 and/or the storage device 1530 to the cache 1512 for quick access by the processor 1510. In this way, the cache can provide a performance boost that avoids processor 1510 delays while waiting for data. These and other modules can control or be configured to control the processor 1510 to perform various actions. Other computing device memory 1515 may be available for use as well. The memory 1515 can include multiple different types of memory with different performance characteristics. The processor 1510 can include any general purpose processor and a hardware or software service, such as service 1 1532, service 2 1534, and service 3 1536 stored in storage device 1530, configured to control the processor 1510 as well as a special-purpose processor where software instructions are incorporated into the processor design. The processor 1510 may be a self-contained system, containing multiple cores or processors, a bus, memory controller, cache, etc. A multi-core processor may be symmetric or asymmetric.

To enable user interaction with the computing device architecture 1500, an input device 1545 can represent any number of input mechanisms, such as a microphone for speech, a touch-sensitive screen for gesture or graphical input, keyboard, mouse, motion input, speech and so forth. An output device 1535 can also be one or more of a number of output mechanisms known to those of skill in the art, such as a display, projector, television, speaker device, etc. In some instances, multimodal computing devices can enable a user to provide multiple types of input to communicate with the computing device architecture 1500. The communications interface 1540 can generally govern and manage the user input and computing device output. There is no restriction on operating on any particular hardware arrangement and therefore the basic features here may easily be substituted for improved hardware or firmware arrangements as they are developed.

Storage device 1530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1525, read only memory (ROM) 1520, and hybrids thereof. The storage device 1530 can include services 1532, 1534, 1536 for controlling the processor 1510. Other hardware or software modules are contemplated. The storage device 1530 can be connected to the computing device connection 1505. In one aspect, a hardware module that performs a particular function can include the software component stored in a computer-readable medium in connection with the necessary hardware components, such as the processor 1510, connection 1505, output device 1535, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object. Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the Disclosure Include:

Statement 1. A computer-implemented method comprising: transmitting a first type of energy at a first angle to a surface of a casing of a wellbore, the casing being bonded to cement layer that is between the casing and a formation of the wellbore; receiving a first signal from the casing; determining a first attenuation of the first type of energy based on the first signal; and determining whether microannulus formation is present between the casing and the cement layer based on one or more characteristics of the first attenuation.

Statement 2. The computer-implemented method of Statement 1, further comprising: transmitting a second type of energy at a second angle to the surface of the casing; receiving, a second signal from the casing; determining a second attenuation of the second type of energy based on the first signal; and determining a state of the cement layer and the microannulus formation based on one or more characteristics of the second attenuation.

Statement 3. The computer-implemented method of Statement 2, further comprising: determining a state of the bond between the casing and the cement layer based on the determination of whether the microannulus formation is present between the casing and the cement layer and the determination of the state of the cement layer and the formation.

Statement 4. The computer-implemented method of Statement 2, wherein the first type of energy is transmitted by a device, and the device transmits the first type of energy while the device is traveling in the wellbore in a first direction.

Statement 5. The computer-implemented method of Statement 2, wherein the second type of energy is transmitted by a device, the device transmits the second type of energy while the device is traveling in the wellbore in a second direction.

Statement 6. The computer-implemented method of Statement 2, wherein the second angle is between 10 and 35 degrees.

Statement 7. The computer-implemented method of Statement 2, wherein the second attenuation of the second type of energy includes A0 measurement waves.

Statement 8. The computer-implemented method of Statement 2, wherein the second type of energy is ultrasonic energy.

Statement 9. The computer-implemented method of Statement 1, further comprising: receiving a second signal from the casing; determining a first attenuation of the first type of energy based on the first signal; determining a second attenuation of the first type of energy based on the second signal; and determining whether microannulus formation is present between the casing and the cement layer based on one or more characteristics of the first attenuation and one or more characteristics of the second attenuation.

Statement 10. The computer-implemented method of Statement 1, wherein the first angle is between 0 and 25 degrees.

Statement 11. The computer-implemented method of Statement 1, wherein the first attenuation of the first type of energy includes lamb waves.

Statement 12. The computer-implemented method of Statement 1, wherein the first type of energy is ultrasonic energy.

Statement 13. A computing system comprising: a communications interface; a memory storing instruction; and at least one processor coupled to the communications interface and the memory, the at least one processor being configured to: transmit a first type of energy at a first angle to a surface of a casing of a wellbore, the casing being bonded to cement layer that is between the casing and a formation of the wellbore; receive a first signal from the casing; determine a first attenuation of the first type of energy based on the first signal; and determine whether a microannulus formation is present between the casing and the cement layer based on one or more characteristics of the first attenuation.

Statement 14. The computing system of Statement 13, wherein the at least one processor is further configured to: transmit a second type of energy at a second angle to the surface of the casing; receive, a second signal from the casing; determine a second attenuation of the second type of energy based on the first signal; and determine a state of the cement layer and the microannulus formation based on one or more characteristics of the second attenuation.

Statement 15. The computing system of Statement 14, wherein the at least one processor is further configured to: determine a state of the bond between the casing and the cement layer based on the determination of whether the microannulus formation is present between the casing and the cement layer and the determination of the state of the cement layer and the formation.

Statement 16. The computing system of Statement 14, wherein to transmit the first type of energy, the at least one processor is further configured to: cause a transmission device to transmit the first type of energy.

Statement 17. The computing system of Statement 16, wherein the transmission device transmits the first type of energy while the transmission device is traveling in the wellbore in a first direction.

Statement 18. The computing system of Statement 14, wherein to transmit the second type of energy, the at least one processor is further configured to: cause a transmission device to transmit the second type of energy.

Statement 19. The computing system of Statement 14, wherein the transmission device transmits the second type of energy while the transmission device is traveling in the wellbore in a second direction.

Statement 20. The computing system of Statement 14, wherein the second angle is between 10 and 35 degrees.

Statement 21. The computing system of Statement 14, wherein the second attenuation of the second type of energy includes A0 measurement waves.

Statement 22. The computing system of Statement 14, wherein the second type of energy is ultrasonic energy.

Statement 23. The computing system of Statement 13, wherein the at least one processor is further configured to: receive a second signal from the casing; determine a first attenuation of the first type of energy based on the first signal; determine a second attenuation of the first type of energy based on the second signal; and determine whether microannulus formation is present between the casing and the cement layer based on one or more characteristics of the first attenuation and one or more characteristics of the second attenuation Statement 24. The computing system of Statement 13, wherein the first angle is between 0 and 25 degrees.

Statement 24. The computing system of Statement 13, wherein the first attenuation of the first type of energy includes lamb waves.

Statement 25. The computing system of Statement 13, wherein the first type of energy is ultrasonic energy.

Statement 26. A tangible, non-transitory computer readable medium storing instructions that, when executed by at least one processor, cause the at least one processor to perform operations comprising: transmitting a first type of energy at a first angle to a surface of a casing of a wellbore, the casing being bonded to cement layer that is between the casing and a formation of the wellbore; receiving a first signal from the casing; determining a first attenuation of the first type of energy based on the first signal; and determining a microannulus formation is present between the casing and the cement layer based on one or more characteristics of the first attenuation.

Statement 27. The tangible, non-transitory computer readable medium of Statement 26, wherein the at least one processor performs operations further comprising: transmitting a second type of energy at a second angle to the surface of the casing; receiving, a second signal from the casing; determining a second attenuation of the second type of energy based on the first signal; and determining a state of the cement layer and the microannulus formation based on one or more characteristics of the second attenuation.

Statement 28. The tangible, non-transitory computer readable medium of Statement 27, wherein the at least one processor performs operations further comprising: determining a state of the bond between the casing and the cement layer based on the determination of whether the microannulus formation is present between the casing and the cement layer and the determination of the state of the cement layer and the formation.

Statement 29. The tangible, non-transitory computer readable medium of Statement 27, wherein the first type of energy is transmitted by a device, and the device transmits the first type of energy while the device is traveling in the wellbore in a first direction.

Statement 30. The tangible, non-transitory computer readable medium of Statement 27, wherein the second type of energy is transmitted by a device, the device transmits the second type of energy while the device is traveling in the wellbore in a second direction.

Statement 31. The tangible, non-transitory computer readable medium of Statement 27, wherein the second angle is between 10 and 35 degrees.

Statement 32. The tangible, non-transitory computer readable medium of Statement 27, wherein the second attenuation of the second type of energy includes A0 measurement waves.

Statement 33. The tangible, non-transitory computer readable medium of Statement 27, wherein the second type of energy is ultrasonic energy.

Statement 34. The tangible, non-transitory computer readable medium of Statement 26, wherein the at least one processor performs operations further comprising: receiving a second signal from the casing; determining a first attenuation of the first type of energy based on the first signal; determining a second attenuation of the first type of energy based on the second signal; and determining whether microannulus formation is present between the casing and the cement layer based on one or more characteristics of the first attenuation and one or more characteristics of the second attenuation.

Statement 35. The tangible, non-transitory computer readable medium of Statement 26, wherein the first angle is between 0 and 25 degrees.

Statement 36. The tangible, non-transitory computer readable medium of Statement 27, wherein the first attenuation of the first type of energy includes lamb waves.

Statement 37. The tangible, non-transitory computer readable medium of Statement 27, wherein the first type of energy is ultrasonic energy.

What is claimed is:

1. A computer-implemented method comprising:

transmitting a first type of energy to a surface of a casing of a wellbore, the casing being bonded to a cement layer that is between the casing and a formation of the wellbore;

receiving at least one multi-mode acoustic measurement signal responsive to the transmitted first type of energy;

determining at least one measured acoustic response characteristic based on the received at least one multi-mode acoustic measurement signal;

receiving predicted cement layer property information and predicted microannulus thickness information;

generating predicted multi-mode acoustic response characteristics based on the predicted cement layer property information and the predicted microannulus thickness information;

determining at least one mismatch between the measured acoustic response characteristics and the predicted multi-mode acoustic response characteristics;

iteratively adjusting at least one of the predicted cement layer property information and the predicted microannulus thickness information based on the at least one mismatch until a convergence criterion is satisfied; and determining updated cement layer property information and updated microannulus thickness information indicative of a presence or absence of a microannulus between the casing and the cement layer.

2. The computer-implemented method of claim 1, further comprising:

transmitting a second type of energy at a second angle to the surface of the casing;

receiving, a second signal from the casing;

determining a second attenuation of the second type of energy based on the first signal; and determining a state of the cement layer and the microannulus formation based on one or more characteristics of the second attenuation.

3. The computer-implemented method of claim 2, further comprising:

determining a state of the bond between the casing and the cement layer based on the determination of whether the microannulus formation is present between the casing and the cement layer and the determination of the state of the cement layer and the formation.

4. The computer-implemented method of claim 2, wherein the first type of energy is transmitted by a device, and the device transmits the first type of energy while the device is traveling in the wellbore in a first direction.

5. The computer-implemented method of claim 2, wherein the second type of energy is transmitted by a device, the device transmits the second type of energy while the device is traveling in the wellbore in a second direction.

6. The computer-implemented method of claim 2, wherein the second angle is between 10 and 35 degrees.

7. The computer-implemented method of claim 2, wherein the second attenuation of the second type of energy includes A0 measurement waves.

8. The computer-implemented method of claim 2, wherein the second type of energy is ultrasonic energy.

9. The computer-implemented method of claim 1, further comprising:

receiving a second signal from the casing;

determining a first attenuation of the first type of energy based on the first signal;

determining a second attenuation of the first type of energy based on the second signal; and determining whether microannulus formation is present between the casing and the cement layer based on one or more characteristics of the first attenuation and one or more characteristics of the second attenuation.

10. The computer-implemented method of claim 1, wherein the first angle is between 0 and 25 degrees.

11. The computer-implemented method of claim 1, wherein the first attenuation of the first type of energy includes lamb waves.

12. The computer-implemented method of claim 1, wherein the first type of energy is ultrasonic energy.

13. A computing system comprising:

a communications interface;

a memory storing instructions; and at least one processor coupled to the communications interface and to the memory, the at least one processor being configured to execute the instructions to perform operations including:

transmit a first type of energy to a surface of a casing of a wellbore, the casing being bonded to a cement layer that is between the casing and a formation of the wellbore;

receive at least one multi-mode acoustic measurement signal responsive to the transmitted first type of energy;

determine at least one measured acoustic response characteristic based on the received at least one multi-mode acoustic measurement signal;

receive predicted cement layer property information and predicted microannulus thickness information;

generate predicted multi-mode acoustic response characteristics based on the predicted cement layer property information and the predicted microannulus thickness information;

determine at least one mismatch between the measured acoustic response characteristics and the predicted multi-mode acoustic response characteristics;

iteratively adjust at least one of the predicted cement layer property information and the predicted microannulus thickness information based on the at least one mismatch until a convergence criterion is satisfied; and determine updated cement layer property information and updated microannulus thickness information indicative of a presence or absence of a microannulus between the casing and the cement layer.

14. The computing system of claim 13, wherein the at least one processor is further configured to:

transmit a second type of energy at a second angle to the surface of the casing;

receive, a second signal from the casing;

determine a second attenuation of the second type of energy based on the first signal; and determine a state of the cement layer and the formation based on one or more characteristics of the second attenuation.

15. The computing system of claim 14, wherein the at least one processor is further configured to:

determine a state of the bond between the casing and the cement layer based on the determination of whether the microannulus formation is present between the casing and the cement layer and the determination of the state of the cement layer and the formation.

16. The computing system of claim 14, wherein to transmit the first type of energy, the at least one processor is further configured to:

cause a transmission device to transmit the first type of energy.

17. The computing system of claim 16, wherein the transmission device transmits the first type of energy while the transmission device is traveling in the wellbore in a first direction.

18. The computing system of claim 14, wherein to transmit the second type of energy, the at least one processor is further configured to:

cause a transmission device to transmit the second type of energy.

19. The computing system of claim 18, wherein the transmission device transmits the second type of energy while the transmission device is traveling in the wellbore in a second direction.

20. A tangible, non-transitory computer readable medium storing instructions that, when executed by at least one processor, cause the at least one processor to perform operations comprising:

transmitting a first type of energy to a surface of a casing of a wellbore, the casing being bonded to a cement layer that is between the casing and a formation of the wellbore;

receiving at least one multi-mode acoustic measurement signal responsive to the transmitted first type of energy;

determining at least one measured acoustic response characteristic based on the received at least one multi-mode acoustic measurement signal;

receiving predicted cement layer property information and predicted microannulus thickness information;

generating predicted multi-mode acoustic response characteristics based on the predicted cement layer property information and the predicted microannulus thickness information;

determining at least one mismatch between the measured acoustic response characteristics and the predicted multi-mode acoustic response characteristics;

iteratively adjusting at least one of the predicted cement layer property information and the predicted microannulus thickness information based on the at least one mismatch until a convergence criterion is satisfied; and determining updated cement layer property information and updated microannulus thickness information indicative of a presence or absence of a microannulus between the casing and the cement layer.

* * * * *